(12) United States Patent
Osada et al.

(10) Patent No.: US 8,388,331 B2
(45) Date of Patent: Mar. 5, 2013

(54) LIQUID FLOW CONVERGING DEVICE AND METHOD OF MANUFACTURING MULTI-LAYER FILM

(75) Inventors: Syunichi Osada, Otsu (JP); Yoshiharu Furuno, Kusatsu (JP); Fumiyasu Nomura, Otsu (JP)

(73) Assignee: Toray Industries, Inc., Tokyo (JP)

( * ) Notice: Subject to any disclaimer, the term of this patent is extended or adjusted under 35 U.S.C. 154(b) by 1001 days.

(21) Appl. No.: 11/628,135

(22) PCT Filed: May 26, 2005

(86) PCT No.: PCT/JP2005/009610
§ 371 (c)(1),
(2), (4) Date: Nov. 29, 2006

(87) PCT Pub. No.: WO2005/115719
PCT Pub. Date: Dec. 8, 2005

(65) Prior Publication Data
US 2008/0067712 A1    Mar. 20, 2008

(30) Foreign Application Priority Data
May 31, 2004 (JP) .................. 2004-160731

(51) Int. Cl.
B29C 47/06 (2006.01)
B29C 47/14 (2006.01)
(52) U.S. Cl. ............. 425/133.5; 264/173.16; 264/176.1; 425/192 R; 425/462
(58) Field of Classification Search ............... 425/133.5, 425/192 R, 462; 264/173.16, 176.1
See application file for complete search history.

(56) References Cited

U.S. PATENT DOCUMENTS

| | | | |
|---|---|---|---|
| 3,531,828 A * | 10/1970 | Nauta ........................ | 425/131.1 |
| 3,557,265 A * | 1/1971 | Chisholm et al. ............ | 264/46.1 |
| 3,565,985 A | 2/1971 | Schrenk et al. | |
| 3,687,589 A | 8/1972 | Schrenk | |
| 3,759,647 A * | 9/1973 | Schrenk et al. ............ | 425/133.5 |
| 3,884,606 A | 5/1975 | Schrenk | |
| 4,426,344 A | 1/1984 | Dinter et al. | |

(Continued)

FOREIGN PATENT DOCUMENTS

| EP | 0 893 517 A2 | 1/1999 |
|---|---|---|
| GB | 1 111 054 A | 4/1968 |

(Continued)

OTHER PUBLICATIONS

International Search Report dated Sep. 6, 2005, application No. PCT/JP2005/009610.

(Continued)

*Primary Examiner* — Yogendra Gupta
*Assistant Examiner* — Joseph Leyson
(74) *Attorney, Agent, or Firm* — RatnerPrestia

(57) ABSTRACT

A liquid flow converging device and a method of manufacturing a multi-layer film. The converging device comprises an element (A) having a large number of slits for passing two liquid flows to be converged therethrough and an element (B) having a first converging part for converging, in a laminar form, a large number of laminar liquid flows formed by passing the liquid flows through the large number of slits to form a first laminar liquid flow. The converging device for the liquid flow comprises a first confluence forming device having two or more elements (A) installed independently of each other and two or more elements (B) installed independently of each other.

18 Claims, 16 Drawing Sheets

U.S. PATENT DOCUMENTS

| | | | |
|---|---|---|---|
| 5,017,116 A | 5/1991 | Carter et al. | |
| 5,066,443 A * | 11/1991 | Cloeren | 264/173.14 |
| 5,269,995 A | 12/1993 | Ramanathan et al. | |
| 5,679,379 A | 10/1997 | Fabbricante et al. | |
| 7,858,006 B2 * | 12/2010 | Furuno et al. | 264/173.12 |
| 2003/0201565 A1 * | 10/2003 | Cloeren | 264/173.16 |
| 2011/0272832 A1 * | 11/2011 | Neavin et al. | 264/1.7 |
| 2011/0272849 A1 * | 11/2011 | Neavin et al. | 264/173.11 |

FOREIGN PATENT DOCUMENTS

| | | |
|---|---|---|
| JP | 55154129 | 12/1980 |
| JP | 3-264958 | 10/1992 |
| JP | 4-278323 A | 10/1992 |
| JP | 8501994 T | 3/1996 |
| JP | 9-183147 A | 7/1997 |
| JP | 2003-112355 A | 4/2003 |
| JP | 2003 251675 A | 9/2003 |
| JP | 2004-034299 | 2/2004 |
| WO | WO 00/48478 A1 | 8/2000 |

OTHER PUBLICATIONS

Supplementary European Search Report dated Jun. 14, 2012, application No. EP 05 74 3782.

* cited by examiner

Fig. 12
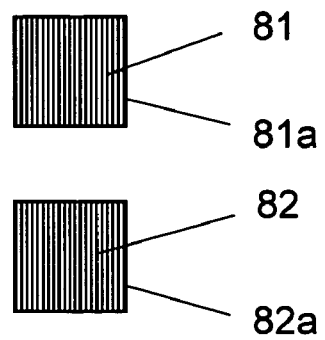
(a)
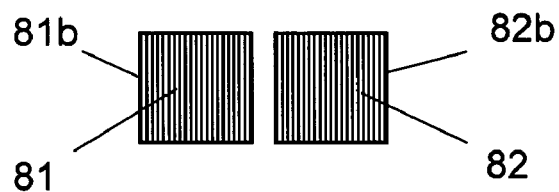
(b)
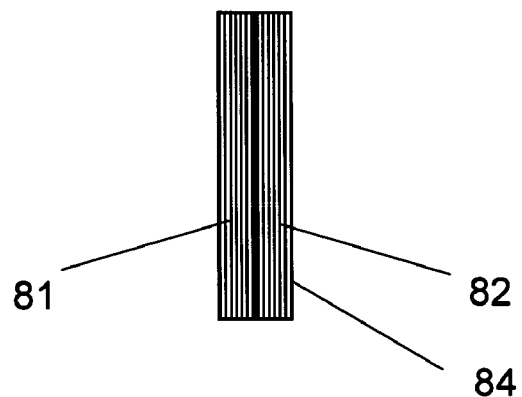
(c)
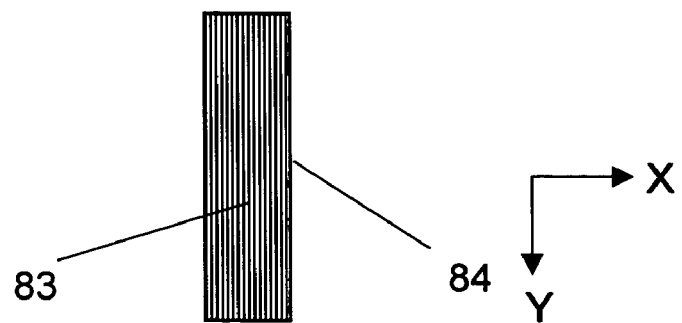
(d)

Fig. 15
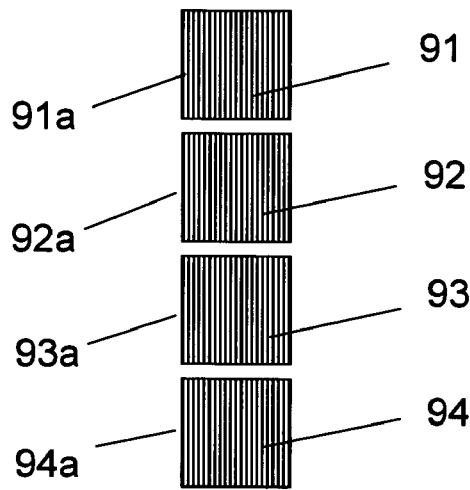
(a)
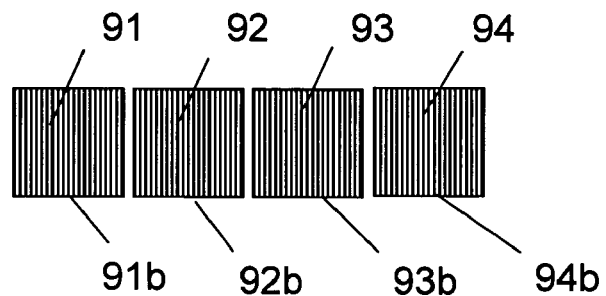
(b)
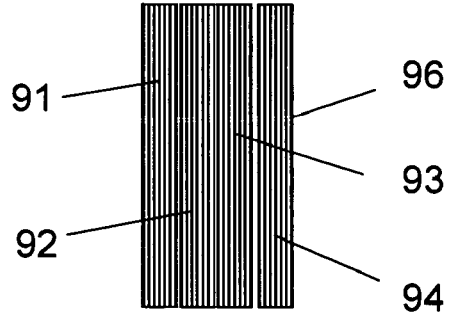
(c)
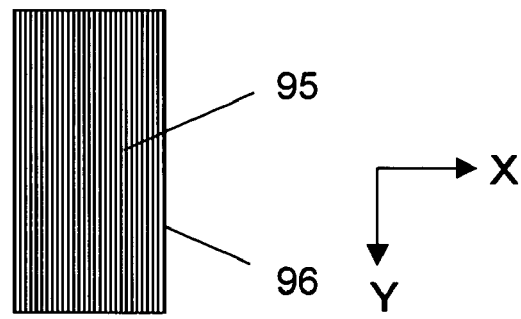
(d)

LIQUID FLOW CONVERGING DEVICE AND METHOD OF MANUFACTURING MULTI-LAYER FILM

This is a U.S. National Phase application of application number PCT/JP2005/009610, filed May 26, 2005.

TECHNICAL FIELD

The present invention relates to a liquid stream combining apparatus for combining at least two liquid streams in layers, to form a layered liquid stream in which the respective liquid streams are disposed in layers, and also relates to a method for producing a multilayered film using the same. In particular, the invention relates to a liquid stream combining apparatus for combining two or more liquid streams different from each other in properties in layers, to form a layered liquid stream having multi-interfaces formed by the different liquid streams combined in layers.

BACKGROUND ART

An apparatus for combining numerous liquid streams to form a multilayered liquid stream is used as a means for efficiently producing a film having a multilayer structure.

As particular example, a multilayer co-extrusion feed block is known (see Patent Documents 1 to 3 described later). Furthermore, so-called an interfacial surface forming apparatus (ISG: Interfacial Surface Generator), i.e., a square mixer is also known (see Patent Documents 4 and 5 described later).

However, the apparatuses proposed in the Patent Documents 1 to 3 can practically produce only a multilayered film comprising up to 300 or less in the total number of layers. If such an apparatus is going to be used to produce a multilayered film comprising more layers, the apparatus must be enlarged in one direction. As a result, stagnant liquid regions are formed in the apparatus. The liquids retained in the apparatus thermally deteriorate and generate foreign matters. In an extreme case, there occurs such a phenomenon that the liquids do not flow uniformly in the apparatus.

In the apparatuses proposed in the Patent Documents 4 and 5, a multilayer co-extrusion feed block and a square mixer are combined to allow the number of layers to be increased efficiently. However, in the case where a multilayered film requiring very high layer accuracy such as an optical interference film or a refractive index control film is produced, the passages of liquid streams in the mixer are deformed to cause layer deformation. So, for maintaining high layer accuracy, the upper limit in the number of layers has been 700 or less. In addition, a multilayered film complicated in the constitution of layer thicknesses required as a refractive index control film or the like could not be produced by any of these conventional methods or apparatuses.

Patent document 1: U.S. Pat. No. 3,884,606
Patent document 2: U.S. Pat. No. 3,687,589
Patent document 3: JP 2003-112355 A (page 2)
Patent document 4: U.S. Pat. No. 3,565,985
Patent document 5: JP 3,264,958 (page 2)

DISCLOSURE OF THE INVENTION

Problem to be Solved by the Invention

The invention provides a liquid stream combining apparatus that can solve the problem of the prior art and allows a multilayered film having a multilayer structure comprising 700 or more layers to be efficiently produced in any desired layer constitution at very high layer accuracy with little generation of foreign matters without the necessity of enlarging the apparatus. The liquid stream combining apparatus of the invention can be preferably used for producing a broadband interference reflection film, a refractive index control film or a multilayered film having layer thicknesses in the order of nanometers.

Means for Solving the Problem

A liquid stream combining apparatus of the invention is a liquid stream combining apparatus for combining at least two liquid streams in layers, comprising:
(a) a component A having numerous slits therein through which the respective liquid streams are passed,
(b) a component B having a first stream combining section therein for combining numerous layered liquid streams in a predetermined order each of which is formed with each of the liquid streams passed the respective slits and for forming a first layered liquid stream,
(c) wherein two or more of the component A are provided independently each other and two or more of the component B are also provided independently each other,
(d) components C each of which has a liquid retaining section therein for receiving the respective liquid streams to be supplied to the liquid stream combining apparatus and for supplying the respective liquid streams to the respective components A, and
(e) a component D which has a second stream combining section therein for combining the first layered liquid streams formed by the respective components B, in layers in a predetermined order, to form a second layered liquid stream.

In the liquid stream combining apparatus of the invention, it is preferred that the number of slits formed in the component A is in the rage of 10 to 400.

In the liquid stream combining apparatus of the invention, it is preferred that the clearance of each of the slits formed in the component A is in the range of 10 μm to 30,000 μm.

In the liquid stream combining apparatus of the invention, it is preferred that three or more the component C are provided, and that a passage dividing section for supplying the liquid streams of the same material to two or more of the component C is installed between a supply source of the liquid streams of the same material and the respective components C.

In the liquid stream combining apparatus of the invention, it is preferred that among pairs, each comprising the component A and the component B, at least two pairs are disposed in such a manner that interfaces of the respective liquid streams in the first layered liquid stream formed by the component B are kept in parallel to each other.

In the liquid stream combining apparatus of the invention, it is preferred that the component C is disposed between the adjacent components A.

In an embodiment of the liquid stream combining apparatus of the invention, passages for supplying the liquid streams from the components C to the respective slits formed in the component A are formed as fine holes.

In an embodiment of the liquid stream combining apparatus of the invention, the vertical sectional area of each of the slits formed in the component A on a liquid supply face side is different from that on a liquid non-supply face side.

In the liquid stream combining apparatus of the invention, it is preferred that a width of each of the slits formed in the component A is in the range of mm to mm.

In the liquid stream combining apparatus of the invention, it is preferred that a length of each of the slits formed in the component A is in the range of 10 mm to 200 mm.

In an embodiment of the liquid stream combining apparatus of the invention, a form of each of the slits provided in the component A includes a portion in which the form is changed in stepwise.

In an embodiment of the liquid stream combining apparatus of the invention, a sectional form of a passage of the first layered liquid stream from the component B to the component D is rectangle.

In the above embodiment of the liquid stream combining apparatus of the invention, it is preferred that a radius R of each corner of the rectangle is in the range of 10 μm to 1 mm.

A method for producing a multilayered film of the invention comprises the steps of supplying at least two liquid streams into the liquid stream combining apparatus of the present invention, forming layered liquid streams in which each of the liquid streams are arranged in layer by the liquid stream combining apparatus, and forming a multilayered film from the layered liquid streams.

As a liquid stream used for carrying out the invention, it is preferred to use a liquid stream composed of any one of the materials described below.

One of the materials is a thermoplastic resin. Examples of the thermoplastic resin include polyolefin resins such as polyethylene, polypropylene, polystyrene and polymethylpentene, alicyclic polyolefin resins, polyamide resins such as nylon 6 and nylon 66, aramid resin, polyester resins such as polyethylene terephthalate, polybutylene terephthalate, polypropylene terephthalate, polybutyl succinate and polyethylene-2,6-napthalate, polycarbonate resin, polyallylate resin, polyacetal resin, polyphenylene sulfide resin, fluorine resins such as tetrafluoroethylene resin, trifluoroethylene resin, trifluorochloroethylene resin, tetrafluoroethylene-hexafluoropropylene copolymer and vinylidene fluoride resin, acrylic resin, methacrylic resin, polyacetal resin, polyglycolic acid resin and polylactic acid resin. These thermoplastic resins can be homopolymer resins or copolymer resins or blends consisting of two or more resins. Any of the thermoplastic resins can also contain various additives such as an antioxidant, antistatic agent, crystal nucleating agent, inorganic particles, organic particles, viscosity reducing agent, thermal stabilizer, lubricant, infrared light absorber, ultraviolet light absorber, dopant for refractive index adjustment, etc.

As the thermoplastic resin, a polyester is more preferred. The reason is that since a polyester is generally lower in molecular weight and allows easy selection of an optimum viscosity compared with other thermoplastic resins, a layered liquid stream comprising 700 or more layers can be easily and efficiently formed by using the liquid stream combining apparatus of the invention.

The polyester can be either a homopolyester or a copolyester respectively as a polycondensation product obtained with a dicarboxylic acid and a diol as components.

Examples of the homopolyester include polyethylene terephthalate, polypropylene terephthalate, polybutylene terephthalate, polyethylene-2,6-naphthalate, poly-1,4-cyclohexanedimethylene terephthalate and polyethylene diphenylate. Especially polyethylene terephthalate is preferred, since it is inexpensive and can be used for very diverse applications.

A copolyester refers to a polycondensation product consisting of at least three or more components selected from the following dicarboxylic acids and diols used as components. Dicarboxylic acids as components include terephthalic acid, isophthalic acid, phthalic acid, 1,4-naphthalenedicarboxylic acid, 1,5-naphthalenedicarboxylic acid, 2,6-naphthalenedicarboxylic acid, 4,4'-diphenyldicarboxylic acid, 4,4'-diphenylsulfonedicarboxylic acid, adipic acid, sebacic acid, dimer acid, cyclohexanedicarboxylic acid, their derivatives, etc. Glycols as components include ethylene glycol, 1,2-propanediol, 1,3-butanediol, 1,4-butanediol, 1,5-pentadiol, diethylene glycol, polyalkylene glycol, 2,2-bis(4'-β-hydroxyethoxyphenyl)propane, isosorbate, 1,4-cyclohexanedimethanol, etc.

Examples of other materials capable of forming the liquid stream used for carrying out the invention include a low molecular compound such as any of various organic solvents or water, and a mixture consisting of two or more compositions such as a resin and an organic solvent, a monomer and an organic solvent, a resin and water, or a monomer and water, etc. Moreover, the state of the liquid stream can be an ordinary liquid, molten fluid, supercritical fluid, liquid crystal or the like. A liquid including a solid dispersed therein, a liquid including bubbles dispersed therein, etc. can also be used.

The term "stream combining" used in the liquid stream combining apparatus of the invention means that liquid streams supplied from individual passages are supplied into one passage. Accordingly, the at least two liquid streams to be combined may be liquid streams different from each other in properties or may also be liquid streams identical with each other in properties. A plural liquid stream formed by dividing a liquid stream supplied from one supply source may also be combined again by the liquid stream combining apparatus of the invention.

Effects of the Invention

The liquid stream combining apparatus for combining liquid streams in layers of the invention comprises a component A provided numerous slits therein through which at least two liquid streams are passed, a component B provided a first stream combining section therein for combining numerous layered streams each of which is formed with each of the liquid streams passed through the respective slits and for forming a first layered liquid stream, wherein two or more components A are provided independently each other and two or more components B are also provided independently each other, and further comprises components C each of which has a liquid retaining section therein and a component D provided a second stream combining section therein for combining the first layered liquid streams formed by the respective components B, in layers to form a second layered liquid stream. As a result, the liquid stream combining apparatus of the invention allows a multilayered liquid stream with very high layer accuracy to be formed with little generation of foreign matters in the apparatus without the necessity of enlarging the apparatus, and the formed multilayered liquid stream can be used for producing a multilayered film having 700 or more layers. Furthermore, even though the number of layers is very large, the thicknesses of the respective layers can be freely controlled.

BRIEF DESCRIPTION OF THE DRAWINGS

FIG. 12 is a group of sectional views along arrows S4-S4, S5-S5, S6-S6 and S7-S7 in FIG. 11. These sectional views are indicated by (a), (b), (c) and (d) sequentially.

FIG. 15 is a group of sectional views along arrows S8-S8, S9-S9, S10-S10 and S11-S11 in FIG. 14. These sectional views are indicated by (a), (b), (c) and (d) sequentially.

Figure 1:
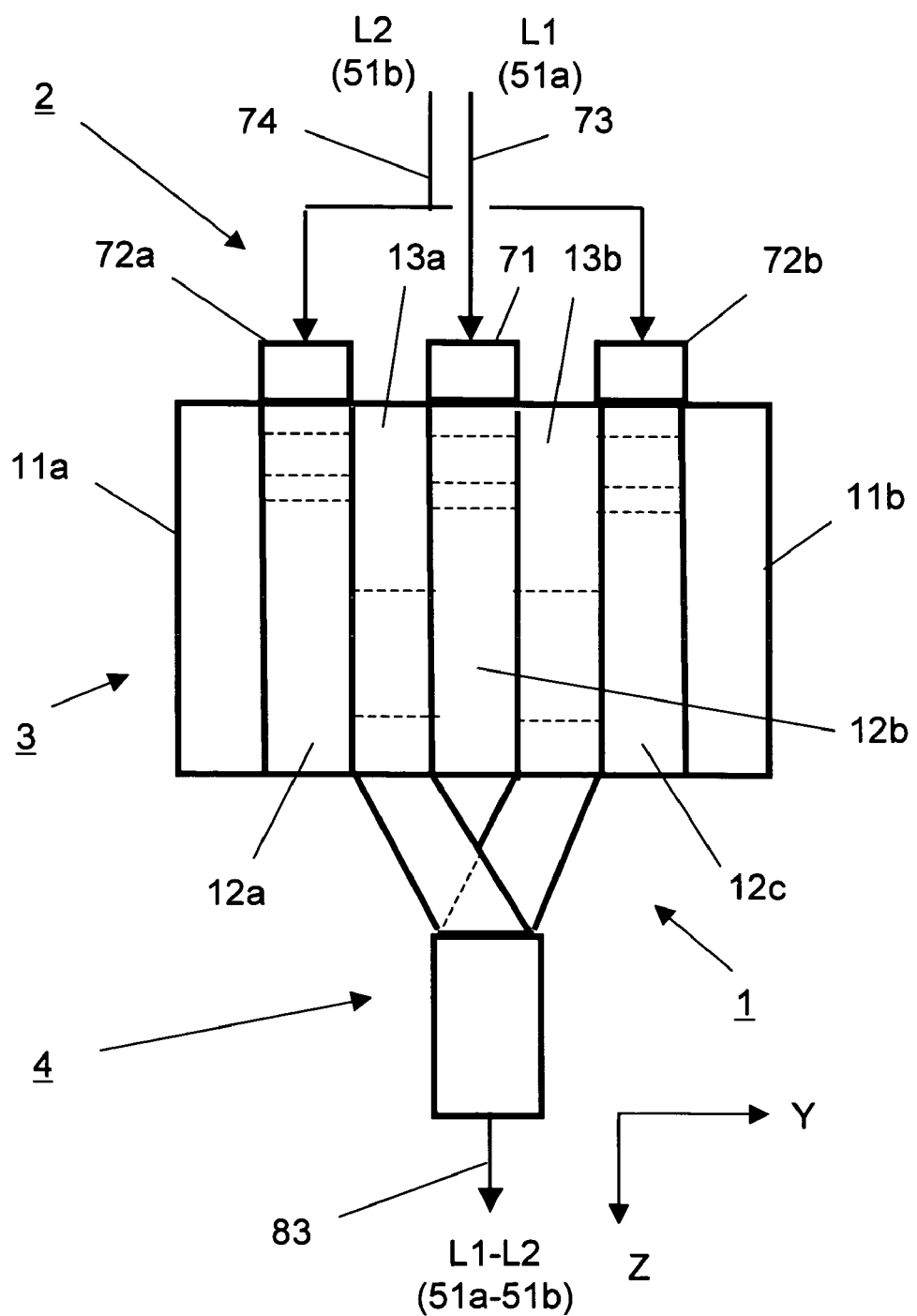
FIG. 1 is a schematic side view of an example of a stream combining apparatus of the invention.

MEANINGS OF SYMBOLS 1 liquid stream combining apparatus
2 liquid stream supplying device
3 first combined stream forming device
4 second combined stream forming device
12 liquid stream introducing plate
13 slit plate
21 liquid stream introducing opening
22 liquid retaining section
31 slit partition wall
32 slit
33 slit section
51 layered liquid stream
61 first stream combining section
62 first stream combining section outlet
81 first layered liquid stream
82 second layered liquid stream
83 combined layered liquid stream
84 second stream combining section
121a, 121b hole
A component A
B component B
C component C
D component D

THE BEST MODES FOR CARRYING OUT THE INVENTION

Embodiments of the liquid stream combining apparatus of the invention will be described below in reference to the drawings.

Figure 2:
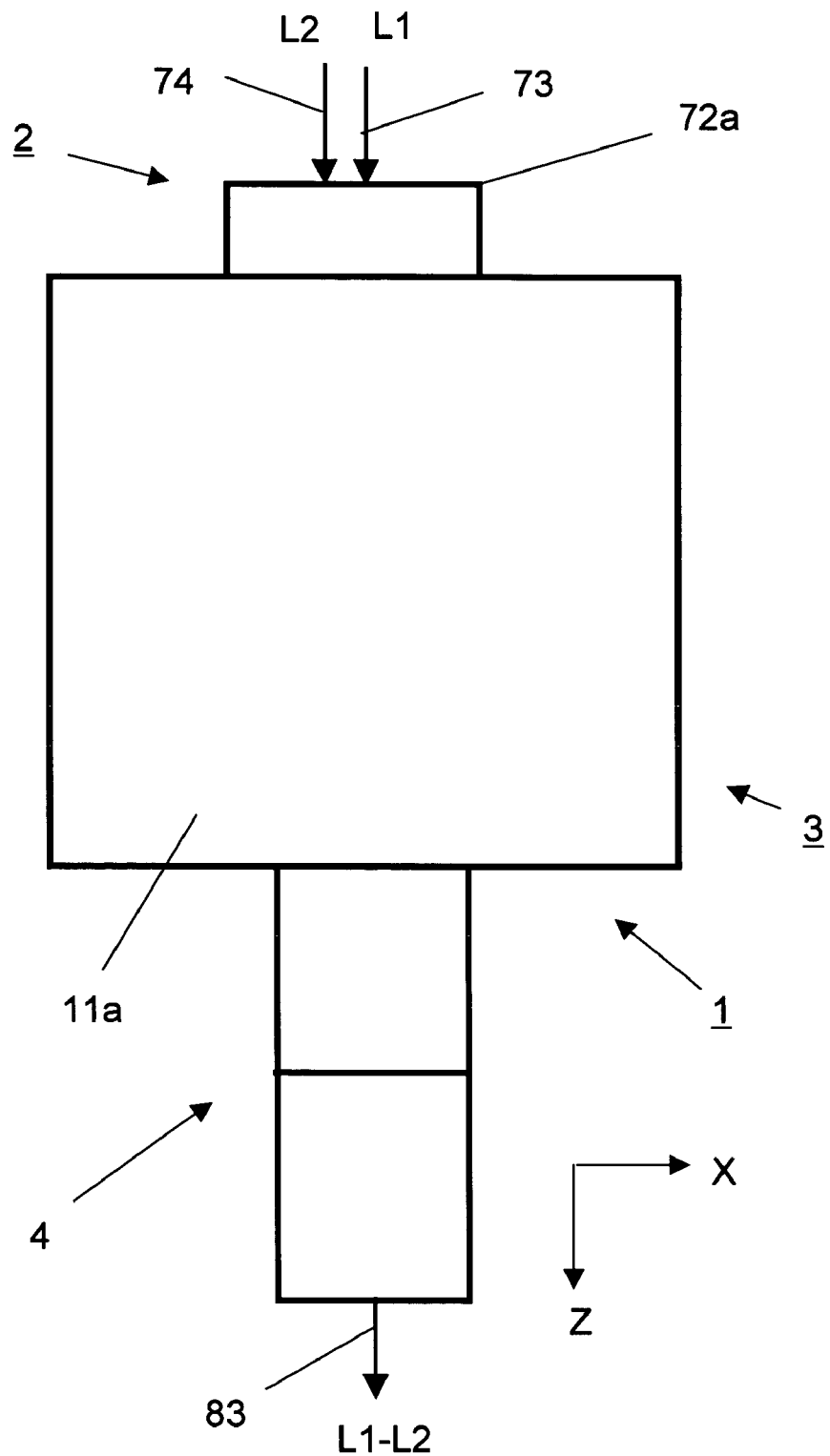
FIG. 2 is a front view of the apparatus shown in FIG. 1.
Figure 3:
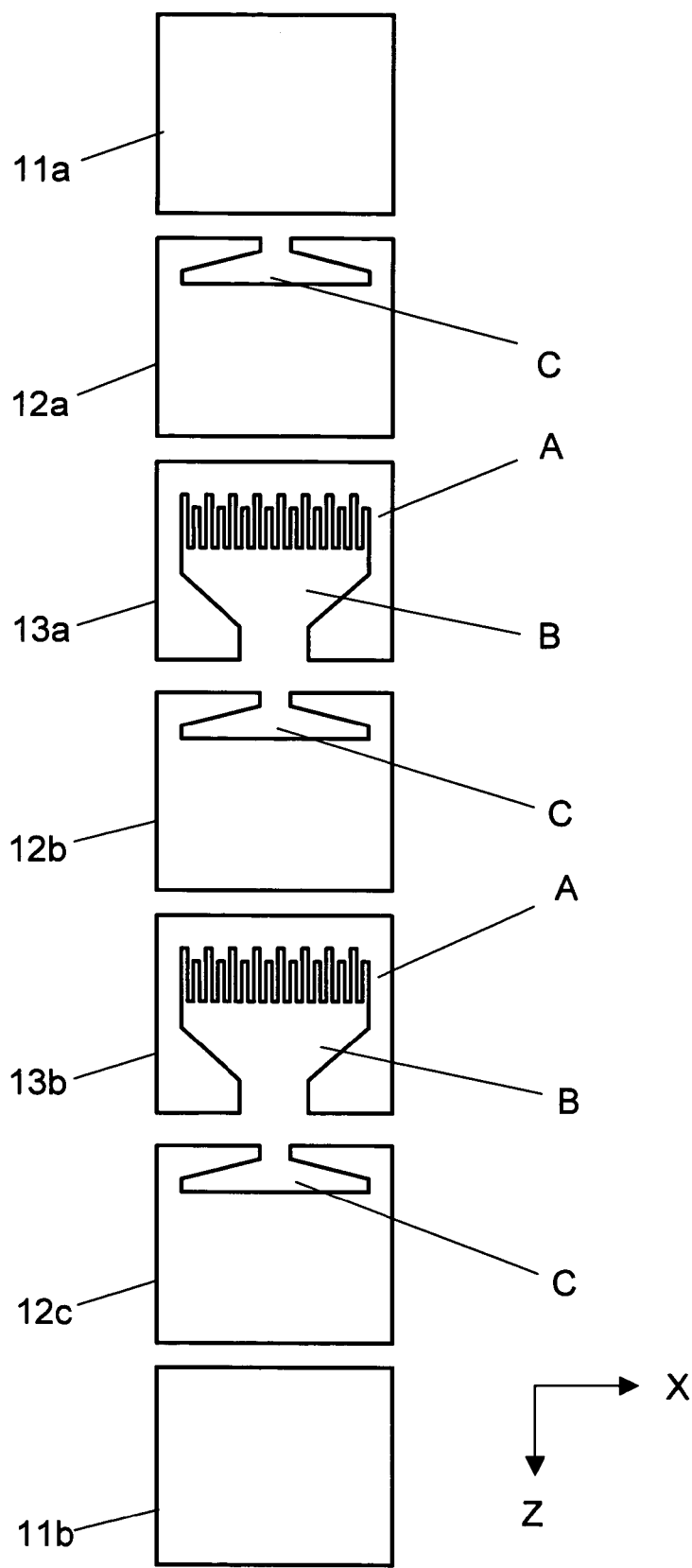
FIG. 3 is a front view of an embodiment of a first combined stream forming device used in a stream combining apparatus of the invention, with respective parts disassembled and developed sequentially.

An embodiment of a liquid stream combining apparatus of the invention is shown in FIGS. 1 through 3. The liquid stream combining apparatus 1 of the invention is composed of a liquid stream supplying device 2, a first combined stream forming device 3 and a second combined stream forming device 4. FIG. 3 shows a state in which the first combined stream forming device 3 is disassembled to show respective parts developed sequentially.

The first combined stream forming device 3 has end plates 11a and 11b at both the ends. In this embodiment, the end plates 11a and 11b have structures mirror-symmetrically identical to each other. In the following description, the end plates 11a and 11b may be generally referred to as end plates 11.

In the first combined stream forming device 3, between the end plates 11a and 11b, a first plate 12a, a second plate 13a, a third plate 12b, a fourth plate 13b and a fifth plate 12c are disposed in this order from the end plate 11a toward the end plate 11b. The direction of this disposition is indicated by the Y-axis direction in FIG. 1. In this embodiment, the second plate 13a and the fourth plate 13b are structurally identical, and the first plate 12a, the third plate 12b and the fifth plate 12c are structurally identical.

Moreover in the first combined stream forming device 3, the second plate 13a and the fourth plate 13b may also have structures mirror-symmetrically identical to each other.

Figure 4:
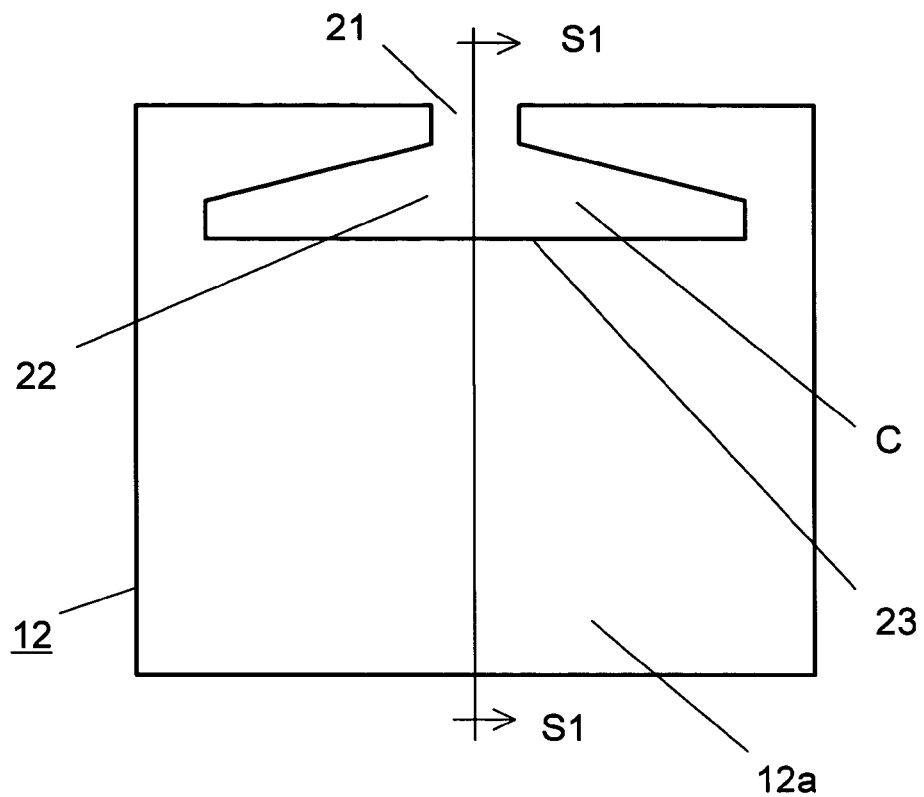
FIG. 4 is a front view of an embodiment of a liquid introducing plate shown in FIG. 3.
Figure 5:
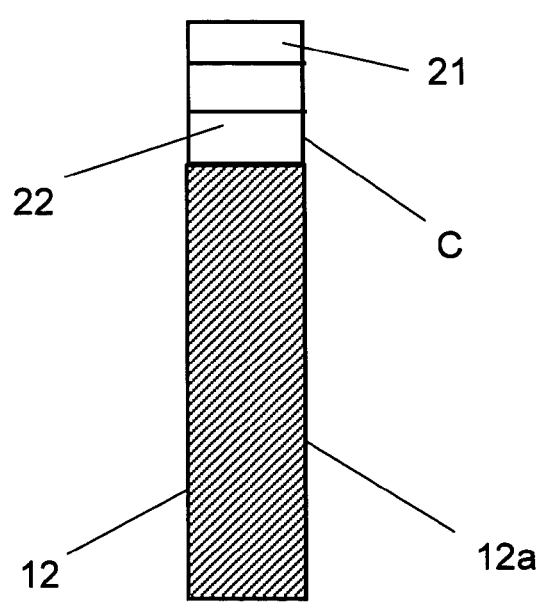
FIG. 5 is a sectional view along arrows S1-S1 in FIG. 4.

These plates are assembled in such a manner that the rear face of the end plate 11a is joined to the front face of the first plate 12a, that the rear face of the first plate 12a is joined to the front face of the second plate 13a, that the rear face of the second plate 13a is joined to the front face of the third plate 12b, that the rear face of the third plate 12b is joined to the front face of the fourth plate 13b, that the rear face of the fourth plate 13b is joined to the front face of the fifth plate 12c, and that the rear face of the fifth plate 12c is joined to the front face of the end plate 11b in this order, being assembled to form the first combined stream forming device 3. Each of the joining portions of the respective plates is provided with a liquid leak preventing means as required. In FIG. 1, when the faces of each plate are viewed in the Y-axis direction, this side is called the front face, and the other side, the rear face. FIG. 4 is a front view of the first plate 12a. FIG. 5 is a sectional view along arrows S1-S1 in FIG. 4. The first plate 12a has a liquid stream introducing opening 21 at the tip, and has a liquid retaining section 22 formed as a space expanding from the opening 21. In this embodiment, as described above, the third plate 12b and the fifth plate 12c are structurally identical with the first plate 12a. Hereinafter, the first plate 12a, the third plate 12b and the fifth plate 12c may be generally called a liquid stream introducing plate 12 as a whole.

Figure 6:
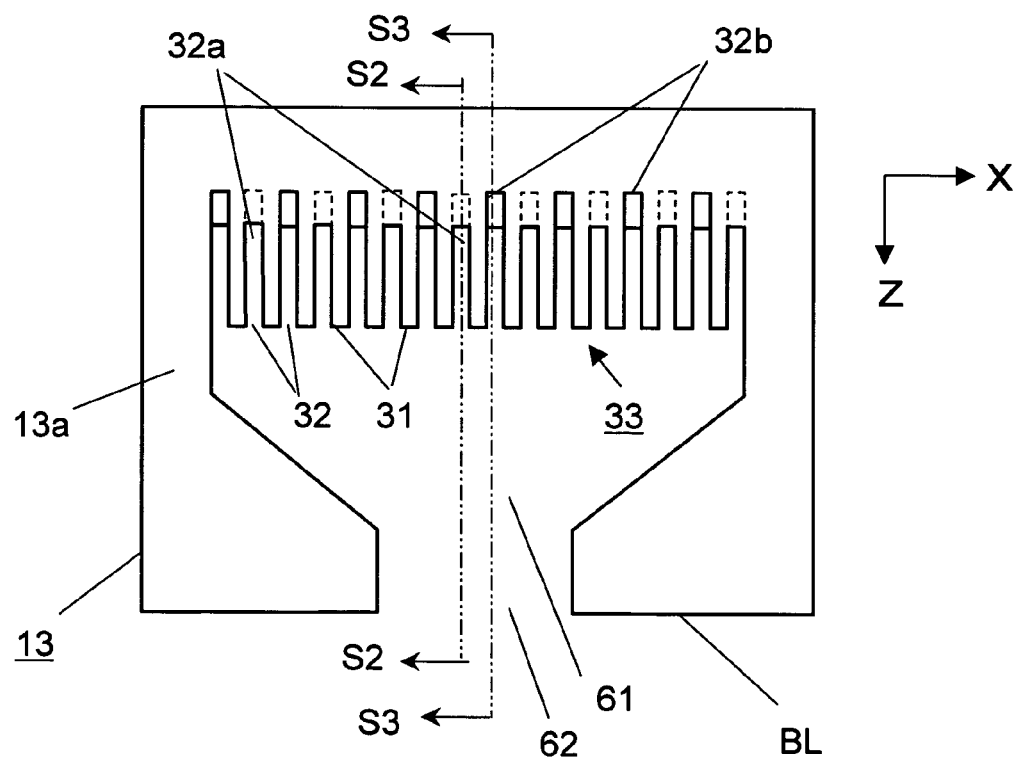
FIG. 6 is a front view of an embodiment of a slit plate shown in FIG. 3.
Figure 7:
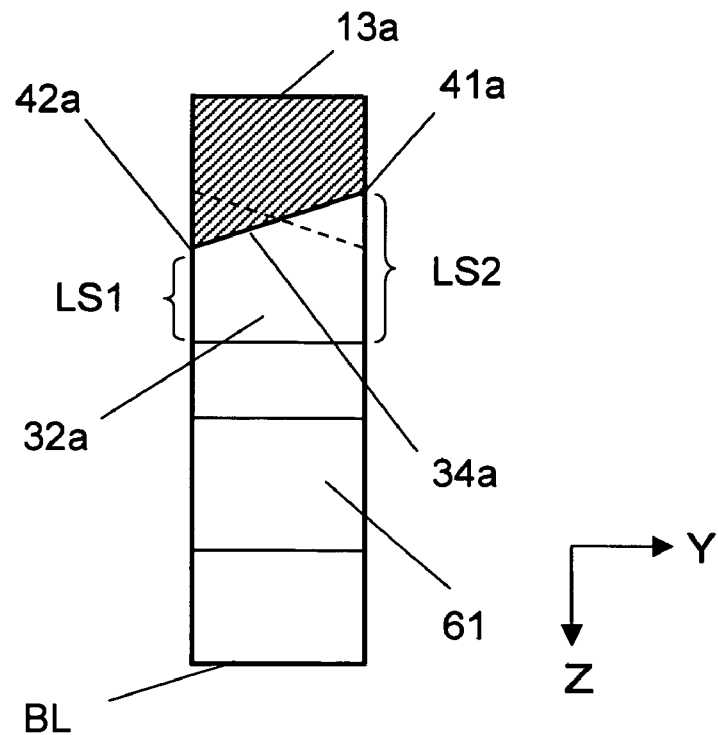
FIG. 7 is a sectional view along arrows S2-S2 in FIG. 6.
Figure 8:
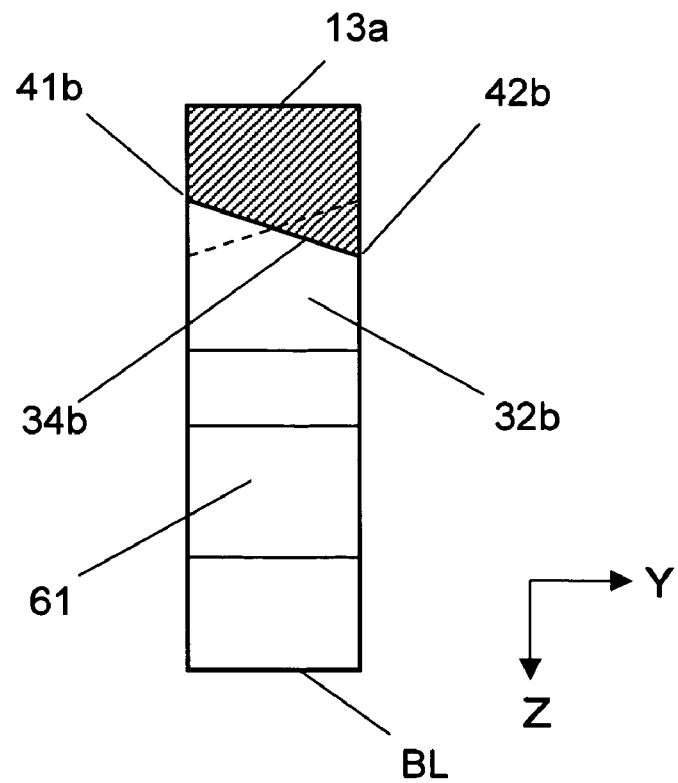
FIG. 8 is a sectional view along arrows S3-S3 in FIG. 6.

FIG. 6 is a front view of the second plate 13a. FIG. 7 is a sectional view along arrows S2-S2 of FIG. 6, and FIG. 8 is a sectional view along arrows S3-S3 in FIG. 6. Above inside the second plate 13a, numerous slit partition walls 31 are provided at intervals. Between the respectively adjacent slit partition walls 31, slits 32 passing from the front face to the rear face of the second plate 13a are formed. The numerous slit partition walls 31 and the numerous slits 32 form a slit section 33. In this embodiment, the numerous slits 32 include two types of slits, namely, a first slit group consisting of slits 32a and a second slit group consisting of slits 32b.

The vertical sectional form of each of the slits 32a constituting the first slit group is shown in FIG. 7. The vertical sectional form of each of the slits 32b constituting the second slit group is shown in FIG. 8. As shown in FIGS. 7 and 8, the ridgeline 34a of each slit 32a and the ridgeline 34b of each slit 32b incline in the thickness direction (in the Y-axis direction in FIGS. 7 and 8) of the second plate 13a. The inclination direction of the ridgeline 34a is reverse to the inclination direction of the ridgeline 34b. In this embodiment as described above, the fourth plate 13b has a structure identical to that of the second plate 13a. In the following description, the second plate 13a and the fourth plate 13b may be generally called a slit plate 13 as a whole.

Figure 9:
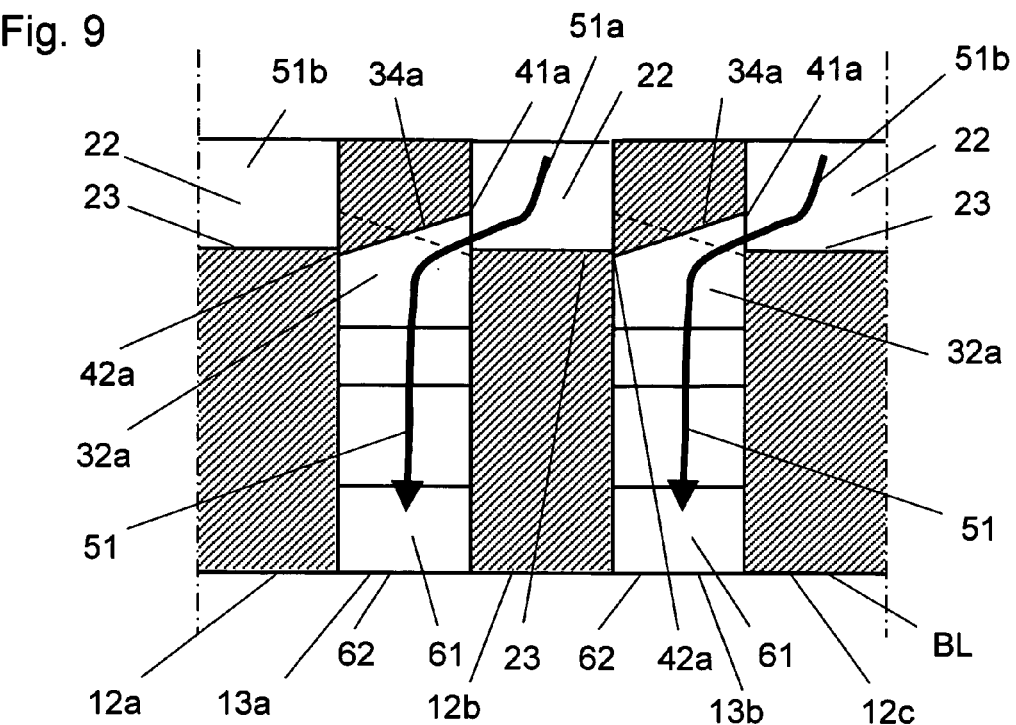
FIG. 9 is a sectional view along arrows S2-S2 in FIG. 6 showing a state in which the slit plates of FIG. 3 and the liquid introducing plates positioned on both sides of the slit plates are assembled.

A sectional view in the same arrow direction as the S2-S2 arrow direction in FIG. 6 showing a state where the three liquid stream introducing plates 12 (first plate 12a, third plate 12b and fifth plate 12c) and the two slit plates 13 (second plate 13a and fourth plate 13b) are alternately laminated, is shown in FIG. 9. A sectional view in the same arrow direction as the S3-S3 arrow direction in FIG. 6 showing the same laminated state is shown in FIG. 10.

Figure 10:
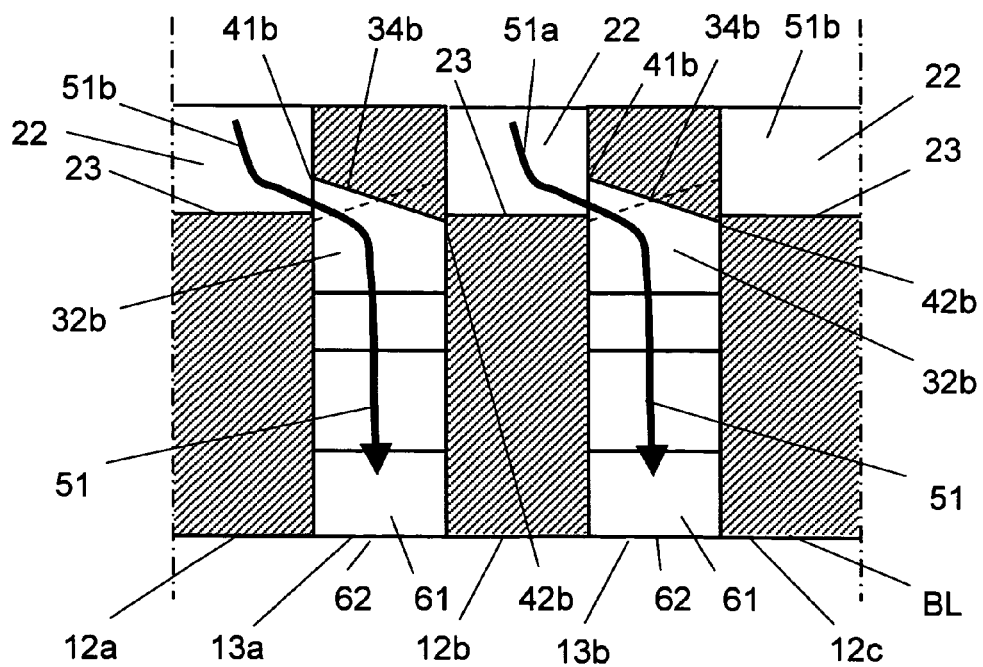
FIG. 10 is a sectional view along arrows S3-S3 in FIG. 6 showing a state in which the slit plates of FIG. 3 and the liquid introducing plates positioned on both sides of the slit plates are assembled.

In FIGS. 9 and 10, the position of the bottom face 23 of the liquid retaining section 22 in each liquid stream introducing plate 12, from the base BL of the liquid stream introducing plate 12 in the height direction is located between the top end portion 41a and the bottom end portion 42a of the ridgeline 34a, and between the top end portion 41b and the bottom end portion 42b of the ridgeline 34b.

Based on this arrangement, in FIG. 9, the first liquid stream 51a flows from the liquid retaining section 22 on the top end portion 41a side of the ridgeline 34a into the slit 32a of the second plate 13a. However, on the bottom end portion 42a side of the ridgeline 32a, since the slit 32a is closed, the first liquid stream 51a does not flow into the slit 32a of the fourth plate 13b. On the other hand, in FIGS. 9 and 10, the second liquid stream 51b flows from the liquid retaining section 22 on the top end portion 41a side of the ridgeline 34a into the slit 32a of the fourth plate 13b. However on the bottom end portion 42a side of the ridgeline 34a, since the slit 32a is closed, the second liquid stream 51b does not flow into the slit 32a of the second plate 13a. Moreover, based on this arrangement, in FIG. 10, the first liquid stream 51a flows from the liquid retaining section 22 on the top end portion 41b side of the ridgeline 34b into the slit 32b of the fourth plate 13b. However, on the bottom end portion 42b side of the ridgeline 34b, since the slit 32b is closed, the first liquid stream 51a does not flow into the slit 32b of the second plate 13a. On the other hand, in FIGS. 9 and 10, the second liquid stream 51b flows from the liquid retaining section 22 on the top end portion 41b side of the ridgeline 34b into the slit 32b of the second plate 13a. However, on the bottom end portion 42b side of the ridgeline 34b, since the slit 32b is closed, the second liquid stream 51b does not flow into the slit 32b of the fourth plate 13b.

Thus, in FIG. 9, from the liquid retaining section 22 of the third plate 12b from which the first liquid stream 51a is supplied, the first liquid stream 51a flows into the slit 32a of the second plate 13a. Further, from the liquid retaining section 22 of the fifth plate 12c from which the second liquid stream 51b is supplied, the second liquid stream 51b flows into the slit 32a of the fourth plate 13b. On the other hand, in FIG. 10, from the liquid retaining section 22 of the third plate 12b from which the first liquid stream 51a is supplied, the first liquid stream 51a flows into the slit 32b of the fourth plate 13b. Further, from the liquid retaining section 22 of the first plate 12a from which the second liquid stream 51b is supplied, the second liquid stream 51b flows into the slit 32b of the second plate 13a.

In this embodiment, the slit plate 13 has further a first stream combining section 61 for forming a first layered liquid stream below the slit section 33. The respective liquid streams 51a and 51b formed as layers by passing through the slits of the slit sections 33 are combined in the first stream combining sections 61 with the form of layers maintained. With the streams combined like this, layered liquid streams 51 are formed. The layered liquid streams 51 flow out of the first stream combining section outlets 62 formed at the bases BL of the slit plates 13 into the subsequent liquid passages. Thus, by the first combined stream forming device 3, at least two layered liquid streams 51 are formed.

In this case, the materials of the end plates 11, the liquid introducing plates 12 and the slit plates 13 may be metals such as iron and alloys such as stainless steel like the materials used to form the parts of the conventional liquid stream combining apparatuses. If there is no problem in view of heat or dimensional accuracy, resins and the like may also be used. Especially in view of strength, processability, dimensional accuracy, heat resistance and corrosion resistance, stainless steel is suitable.

The liquid stream 51a and the liquid stream 51b destined to form the layered liquid streams 51 are respectively supplied from the liquid stream supply device 2 to the first combined stream forming device 3. In FIG. 1, the liquid stream supply device 2 has liquid stream supply ports 72a, 71 and 72b connected with the liquid stream introducing openings 21 of the liquid stream introducing plates 12. The liquid stream supply port 71 is connected with the first liquid stream supply pipe 73 for supplying the first liquid stream L1 (51a). The liquid stream supply ports 72a and 72b are connected with the second liquid stream supply pipe 74 for supplying the second liquid stream L2 (51b). The first liquid stream supply pipe 73 is engaged with a first liquid stream supply source (not shown in the drawing), and the second liquid stream supply pipe 74 is engaged with a second liquid stream supply source (not shown in the drawing).

Figure 11:
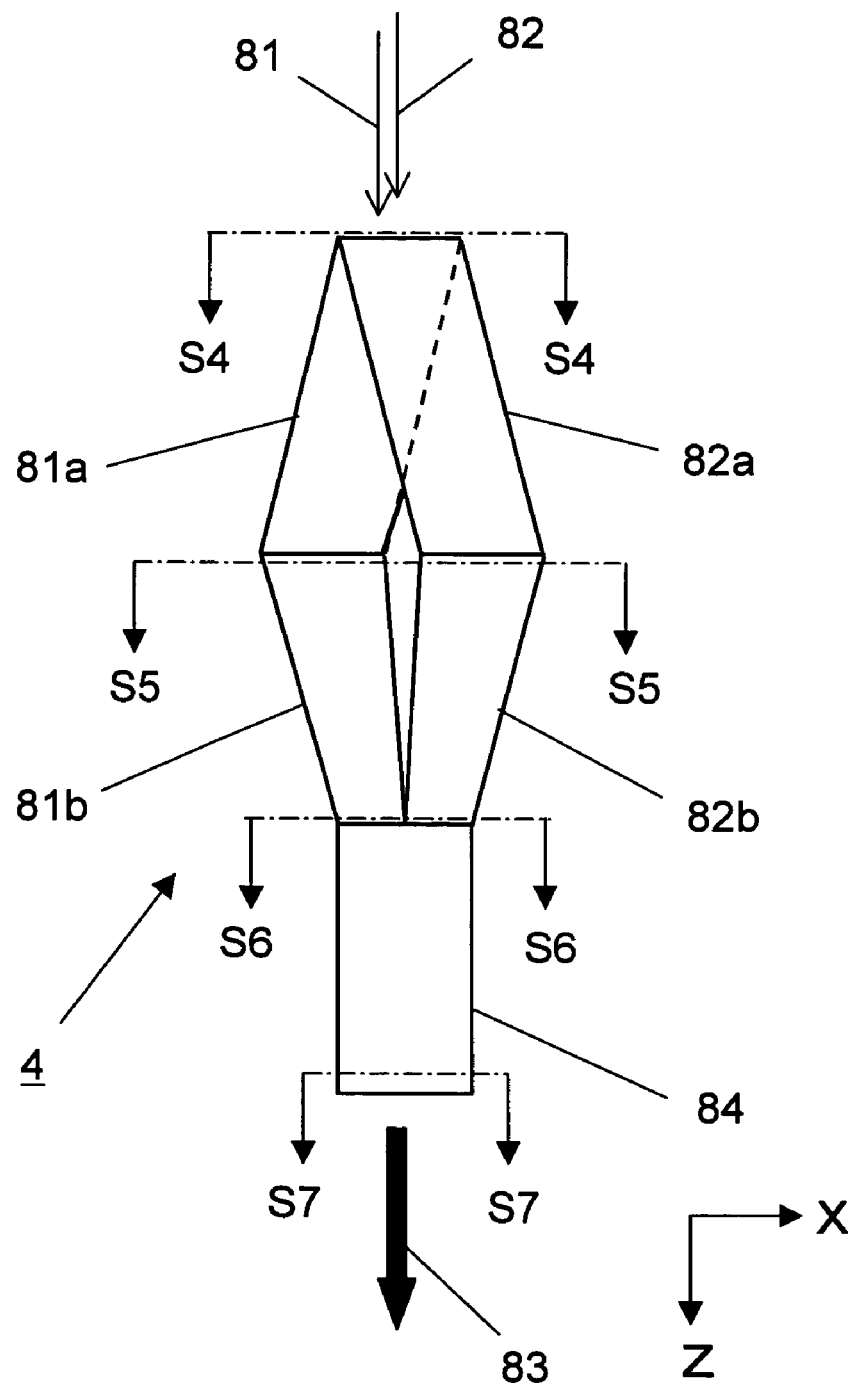
FIG. 11 is a schematic front typical view of an embodiment of a second combined stream forming device used in a stream combining apparatus equipped with the first combined stream forming device shown in FIG. 3.

The first liquid stream L1 (51a) and the second liquid stream L2 (51b) respectively supplied from the liquid supply device 2 to the first combined stream forming device 3 flow out, as described before, from the first stream combining section outlet 62 of the second plate 13a as a first layered liquid stream 81 in which the liquid stream 51a and the liquid stream 51b are positioned alternately in layers, and flow out from the first stream combining section outlet 62 of the fourth plate 13b as the second layered liquid stream 82 in which the liquid stream 51a and the liquid stream 51b are positioned alternately in layers. This state is shown in FIG. 11. Meanwhile, in this embodiment, the first layered liquid stream 81 and the second layered liquid stream have the same layer structures.

FIG. 11 is a schematic typical front view of the second combined stream forming device 4. In FIG. 11, the second combined stream forming device 4 is composed of passages 81a and 81b in which the first layered liquid stream 81 flows with its layers maintained, passages 82a and 82b in which the second layered liquid stream 82 flows with its layers maintained, and a second stream combining section 84 in which the first layered liquid stream 81 flowing from the passages 81a and 81b and the second layered liquid stream 82 flowing from the passages 82*a* and 82*b* are combined to form a combined layered liquid stream 83.

FIG. 12 show the schematic cross sections of the passages at four locations sequentially in the flow direction of the liquid streams in FIG. 11. FIG. 12 (*a*) is a sectional view along arrows S4-S4 in FIG. 11. FIG. 12 (*b*) is a sectional view along arrows S5-S5 in FIG. 11. FIG. 12 (*c*) is a sectional view along arrows S6-S6 in FIG. 11. FIG. 12(*d*) is a sectional view along arrows S7-S7 in FIG. 11.

FIG. 12 (*a*) shows the positional relation between the first layered liquid stream 81 at the inlet portion of the passage 81*a* and the second layered liquid stream 82 at the inlet portion of the passage 82*a*. FIG. 12 (*b*) shows the positional relation between the first layered liquid stream 81 and the second layered liquid stream 82 in which the passage 81*a* and the passage 82*a* disposed in the Y-axis direction (in the direction perpendicular to the paper face of FIG. 11) in FIG. 12 (*a*) have been changed to be disposed in the X-axis direction (in the right and left direction on the paper face of FIG. 11). FIG. 12 (*c*) shows the positional relation between the first layered liquid stream 81 and the second layered liquid stream 82 at the inlet portion of the second stream combining section 84. FIG. 12 (*d*) shows the combined layered liquid stream 83 formed at the outlet portion of the second stream combining section 84, in which the first layered liquid stream 81 and the second layered liquid stream 82 are combined.

In this embodiment, the second plate 13*a* having the slit section 33 and the fourth plate 13*b* having the slit section 33 correspond to the components A referred to in the invention, each of which has numerous slits for allowing either of the two liquid streams to be passed through the slits. Two components A independent from each other exist in this embodiment. The second plate 13*a* having the first stream combining section 61 and the fourth plate 13*b* having the first stream combining section 61 correspond to the components B referred to in the invention, each of which has the first stream combining section for forming the first layered liquid stream. Two components B independent from each other exist in this embodiment. The liquid stream introducing plates 12 respectively having the liquid retaining section 22 correspond to the components C referred to in the invention, respectively having a liquid retaining section, for supplying the respective liquid streams to the respective components A. Further, the second combined stream forming device 4 for combining the first layered liquid stream 81 and the second layered liquid stream 82 for forming the combined layered liquid stream 83 corresponds to the component D referred to in the invention, having the second stream combining section for combining the respective first layered liquid streams formed by the respective components B, in a predetermined order in layers, to form the second layered liquid stream.

In the case where the liquid stream combining apparatus of the invention is used to produce a multilayered film comprising 700 or more layers, the first combined stream forming device 3 is provided with numerous components A and components B as many as the components A.

Figure 13:
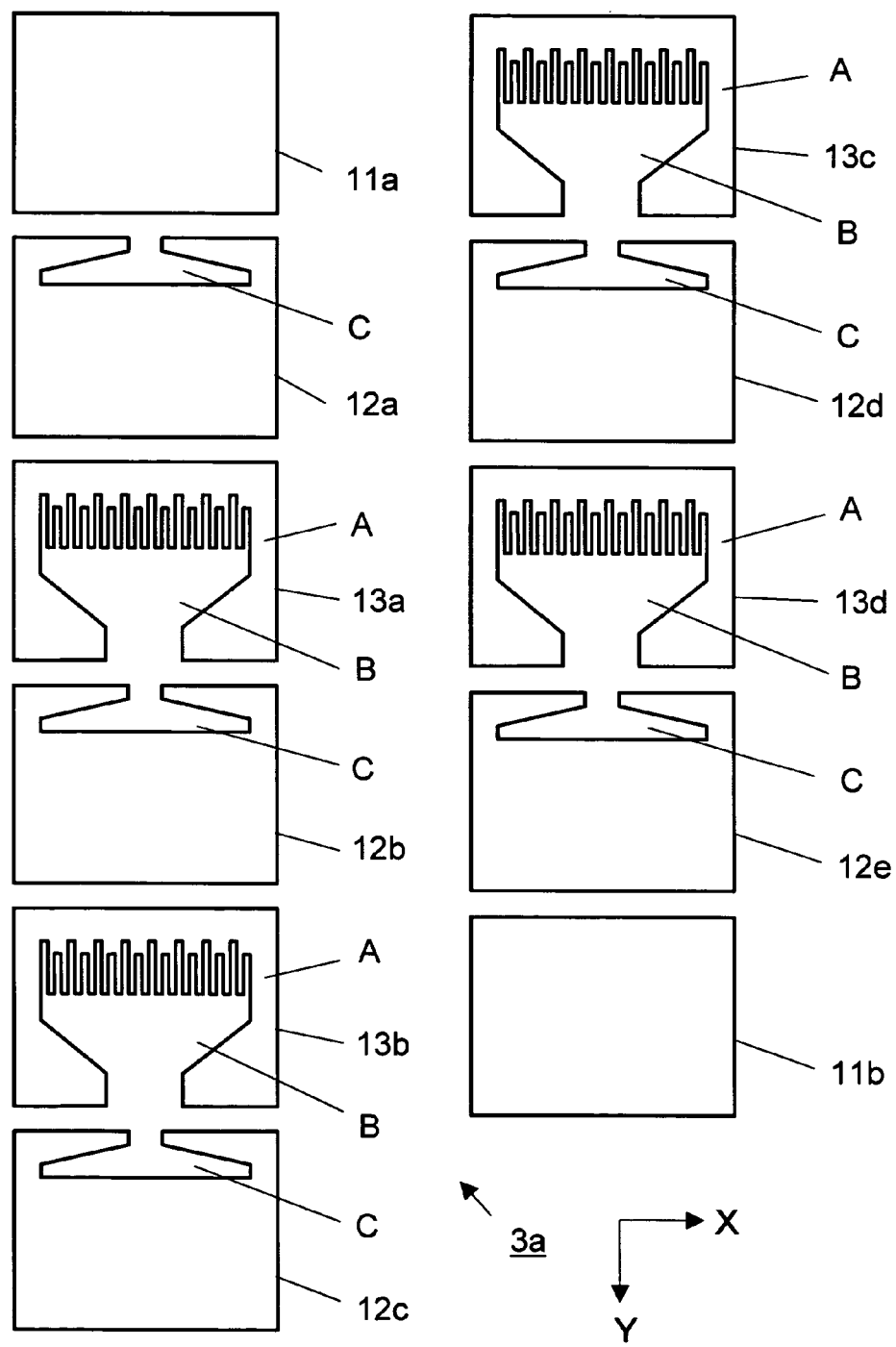
FIG. 13 is a front view showing another embodiment of a first combined stream forming device used in a stream combining apparatus of the invention, with respective parts disassembled and developed sequentially.

FIG. 13 shows the respective plates corresponding to the components A, components B and components C in the first combined stream forming device 3*a* of another embodiment, developed sequentially as in the case of FIG. 3. The first combined stream forming device 3*a* of this embodiment is composed of an end plate 11*a*, a first plate 12*a*, a second plate 13*a*, a third plate 12*b*, a fourth plate 13*b*, a fifth plate 12*c*, a sixth plate 13*c*, a seventh plate 12*d*, an eighth plate 13*d*, a ninth plate 12*e* and an end plate 11*b*. In the second plate 13*a*, fourth plate 13*b*, sixth plate 13*c* and eighth plate 13*d*, a component A and a component B are formed respectively.

That is, in the first combined stream forming device 3*a*, four components A independent from each other exist and four components B independent from each other exist. Moreover, in the first plate 12*a*, third plate 12*b*, fifth plate 12*c*, seventh plate 12*d* and ninth plate 12*e*, a component C is formed respectively. These plates are assembled as in the embodiment of FIG. 3.

Figure 14:
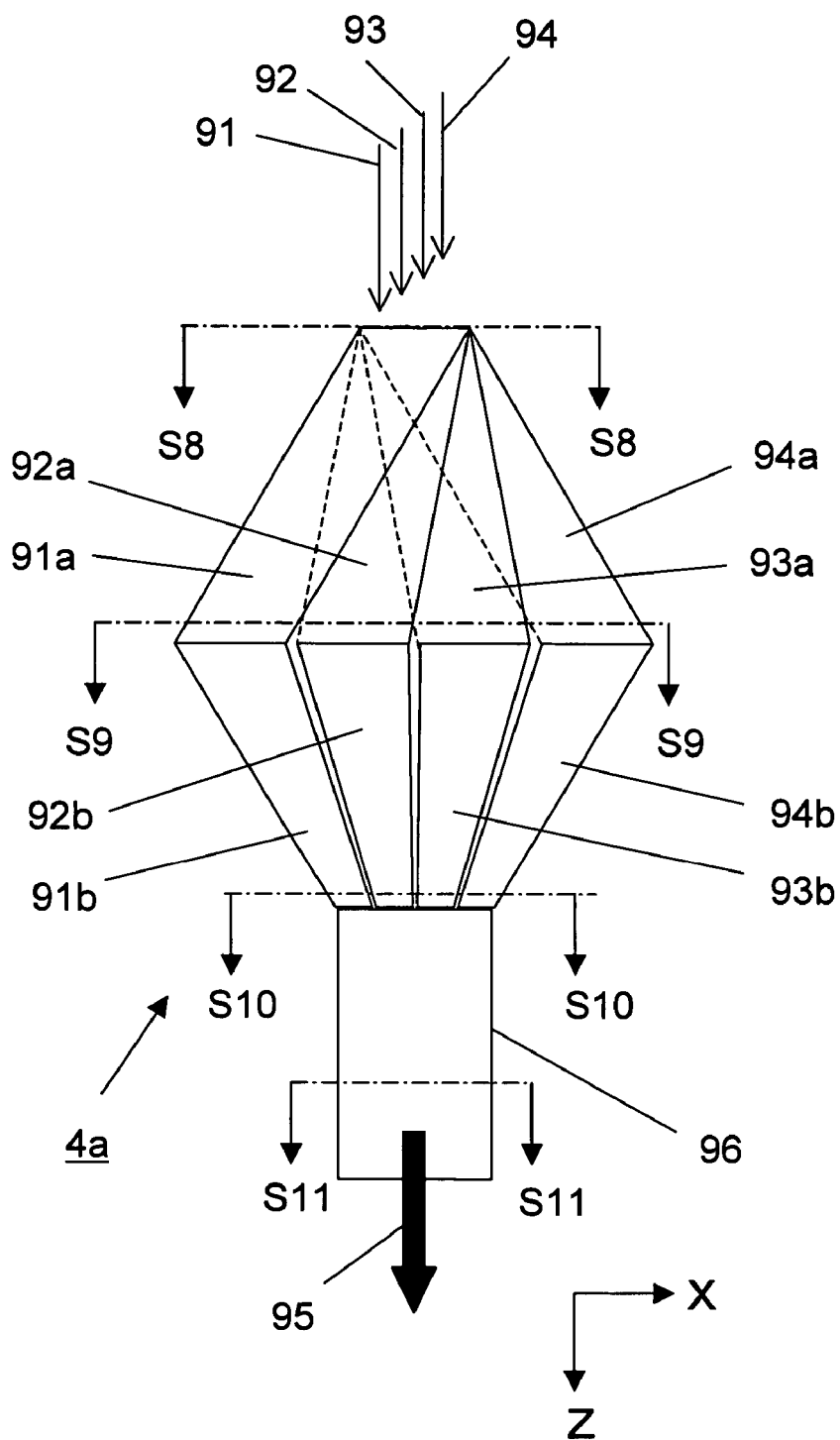
FIG. 14 is a schematic front typical view showing an embodiment of a second combined stream forming device used in a stream combining apparatus equipped with the first combined stream forming device shown in FIG. 13.

The layered liquid streams formed by using the first combined stream forming device 3*a* shown in FIG. 13 are shown in FIGS. 14 and 15 as in the case of FIGS. 11 and 12. The first combined stream forming device 3*a* is used to form a first layered liquid stream 91, a second layered liquid stream 92, a third layered liquid stream 93 and a fourth layered liquid stream 94. The formed respective layered liquid streams flow through passages 91*a* and 91*b*, passages 92*a* and 92*b*, passages 93*a* and 93*b*, and passages 94*a* and 94*b* respectively, to reach the second stream combining section 96. In the second stream combining section 96, the respective layered liquid streams are combined to form a combined layered liquid stream 95.

If the first combined stream forming device equipped with numerous components A and numerous components B as described above is used, any of various multilayered films comprising 700 or more layers can be produced with high accuracy maintained.

Particularly, in the case where the layers formed of liquid stream L1 and the layers formed of liquid stream L2 are layered in the order of L1(1)/L2(1)/L1(2)/L2(2)/L1(3)/L2(3)/ . . . /L1(n−1)/L2(n−1)/L1(n), a multilayered film in which the thicknesses of the layers formed of liquid stream L1 become gradually thinner from L1(1) to L1(n), while the thicknesses of the layers formed of liquid L2 become gradually thicker from L2(1) to L2(n−1) can also be produced. In this case, n refers to the layer number of the layer formed of liquid stream L1 or liquid stream L2, counted from either of the surfaces of the film.

Moreover, the following multilayered film can also be produced: among the layers formed of liquid stream L1, in the range from L1(1) to L1(n/2), the thicknesses of the layers become gradually thicker, while in the range from L1((n+1)/2) to L1(n), the thicknesses of the layers become gradually thinner, and on the other hand, among the layers formed of liquid stream L2, in the range from L2(1) to L2((n−1)/2), the thicknesses of the layers become gradually thinner, while in the range from L2((n)/2) to L2(n−1), the thicknesses of the layers become gradually thicker. In this case, n refers to the layer number of the layer formed of liquid stream L1 or liquid stream L2, counted from either of the surfaces of the film.

In the prior art, when it is intended to remarkably increase the number of layers, it is necessary to use a static mixer. So, only the following layered products can be obtained; a layered product comprising layers with the same thickness, or a layered product comprising layers gradually increasing in thickness, namely, layers monotonously increasing in thickness, or a layered product comprising layers gradually decreasing in thickness, namely, layers monotonously decreasing in thickness, or a layered product comprising layers with random thicknesses caused by uneven liquid streams out of control.

According to the invention, the thicknesses of layers can be controlled by adjusting the forms of respective slits, especially the clearances of the slits and/or the lengths of the slits. Further, the apparatus of the invention has two or more components A independent from each other. So, even a film comprising very many layers, which cannot be produced by the prior art, can be designed to have a desired layer constitution.

It is preferred that each of the components A has 10 to 400 slits. A more preferred range is from 100 to 350. If the number of slits is smaller than 10, very many components A are necessary to make it difficult to align the respective components. The use of such an apparatus is disadvantageous in view of production cost of layered products. Furthermore, it is not preferred either, since the apparatus must be enlarged in the Y-axis direction (see FIG. 1 ). On the other hand, if the number of slits is larger than 400, the apparatus must be enlarged in the X-axis direction (see FIG. 2), causing stagnant liquid stream regions to be formed in the apparatus, and causing the flow velocities of liquid streams through the slits positioned on the end sides in the X-axis direction to be uneven. So, a component with more than 400 slits is not preferred. If the number of slits is 100 to 350, the apparatus can have a size well balanced in the X-axis direction and in the Y-axis direction and is easy to use. In such an apparatus, stagnant liquid stream regions are difficult to be formed in the apparatus, and uneven flow velocities of liquid streams do not occur. If such an apparatus is used, a laminated product comprising very many layers can be efficiently produced.

It is preferred that the clearances of slits are 10 μm to 30,000 μm. The clearance of a slit refers to the width of the slit 32a or 32b of FIG. 6 in the X-axis direction. A more preferred range is from 100 μm to 10,000 μm. If the clearances of the slits are smaller than 10 μm, it is difficult to uniformly control the flow rates at the slits because of the limit in processing accuracy. If the clearances of the slits are larger than 30,000 μm, the apparatus becomes too large in the X-axis direction. Further, depending on the flow rates of the liquid streams, the pressure losses at the respective slits may become so small as not to allow the flow rates of the liquid streams flowing through the respective slits to be uniform. If the clearances of the slits are 100 μm to 10,000 μm, for example, the distribution of the liquid streams forming the respective layers in the width direction (in the Y-axis direction) and the distribution of thicknesses of respective layers can be kept uniform while it is not required to enlarge the apparatus, and as a result, a layered product having very high layer accuracy can be obtained.

It is preferred that the lengths of the slits are 20 mm to 100 mm. The length of a slit refers to the length of the slit 32a or 32b of FIG. 6 in the Z-axis direction. It is more preferred that the lengths of the slits are 30 mm to 100 mm. If the lengths of the slits are shorter than 20 mm, the pressure losses of the liquid streams at the slits become so small that the flow rates of the liquid streams flowing through the respective slits may not be able to be controlled uniformly. Further, since the flow velocities of the liquid streams in the slits become uneven in the Y-axis direction, the liquid stream layers become uneven in the width direction (Y-axis direction). On the other hand, if the lengths of the slits are longer than 200 mm, the pressure losses of the liquid streams become so large that the liquid streams are likely to leak from the apparatus. Moreover, if the apparatus is used repetitively, it can happen that the slits are deformed.

It is preferred that the widths of the slits are 10 mm to 200 mm. The width of a slit refers to the length of the slit 32a or 32b of FIG. 6 in the Y-axis direction (see FIGS. 7 and 8). It is more preferred that the widths of the slits are 20 mm to 100 mm. If the widths of the slits are smaller than 10 mm, the slits are insufficient in strength and become likely to be deformed. If the widths of the slits are larger than 200 mm, the clearances of the slits cannot be accurately processed. Moreover, the flow velocities of the liquid streams become very uneven in the Y-axis direction.

It is preferred that each of the slits is designed in such a manner that the difference between the pressure loss at the inlet portion of the slit and that at the outlet portion becomes 0.5 MPa to 10 MPa by adjusting the clearance, length and width of the slit. It is more preferred that the pressure loss difference is 1 MPa to 8 MPa. If the pressure loss difference is smaller than 0.5 MPa, the liquid streams through the respective slits do not flow uniformly at the designed flow rate, to lower the liquid stream layer accuracy. If the pressure loss difference is larger than 8 MPa, the pressure loss difference in the entire stream combining apparatus becomes so large that a large load acts on the liquid stream supply device. Further, repetitive use is likely to make the slits deformed, to lower the liquid stream layer accuracy.

It is preferred that the slit section 33 (see FIG. 6) of a component A includes a region (slit group) in which the slits change in form stepwise in the X-axis direction. In this case, a portion gradually changing in the layer thickness can be easily formed in the layered product. This embodiment can be preferably used for producing, for example, an interference reflection film. This allows the reflection band of the interference reflection film to be easily broadened. Moreover, it can also be preferably used for producing a refractive index control film. It allows the production of a film in which the refractive index gradually changes.

The liquid retaining section 22 (see FIG. 4) in each component C of the invention has a function of distributing the liquid stream into the slits of the component A. The presence of the liquid retaining section 22 allows the liquid stream to be supplied into the slits efficiently. Further, since the flow rate of the liquid stream flowing in each slit can be decided basically by the pressure loss of the liquid stream in the slit, the flow rate of the liquid stream flowing in each slit of the component A can be controlled by the slit clearance and the slit length only. Thus, not only the components A but also the entire stream combining apparatus can be easily designed.

It is preferred that the vertical sectional area of each slit on the liquid stream supply face side of the component A is different from that of the slit on the liquid stream non-supply face side. This embodiment is shown in FIG. 7. Like the slit 32a of FIG. 7, it is desirable that the slit length LS2 on the liquid stream supply face side is different from the slit length LS1 on the liquid stream non-supply face side, while the clearance of the slit (see FIG. 6) remains constant. It is more preferred that the slit length LS2 on the liquid stream supply face side is longer than the slit length LS1 on the liquid stream non-supply face side. In this constitution, the components C and the components A can be directly connected with each other, and a layered liquid stream 51 having a multilayer structure in which the first liquid stream 51a and the second liquid stream 51b are alternately layered can be easily formed. To obtain the structure with different sectional areas like this, it is preferred that the Y-Z axis faces of the slits 32a and 32b are trapezoidal as shown in FIGS. 7 and 8.

If the components C and the components A are directly connected with each other, the number of parts constituting the first combined stream forming device 3 becomes small, to allow the apparatus to be reduced in size. It is not required that the aligning accuracy between the components C and the components A is high, and the pressure loss can be adjusted by the clearance of each slit only. So, a layered product having higher layer accuracy can be obtained. Further, since the difference in the flow rates of liquid streams in the Y-axis direction becomes small, the liquid stream layer accuracy at different positions in the Y-axis direction becomes also high.

Figure 16:
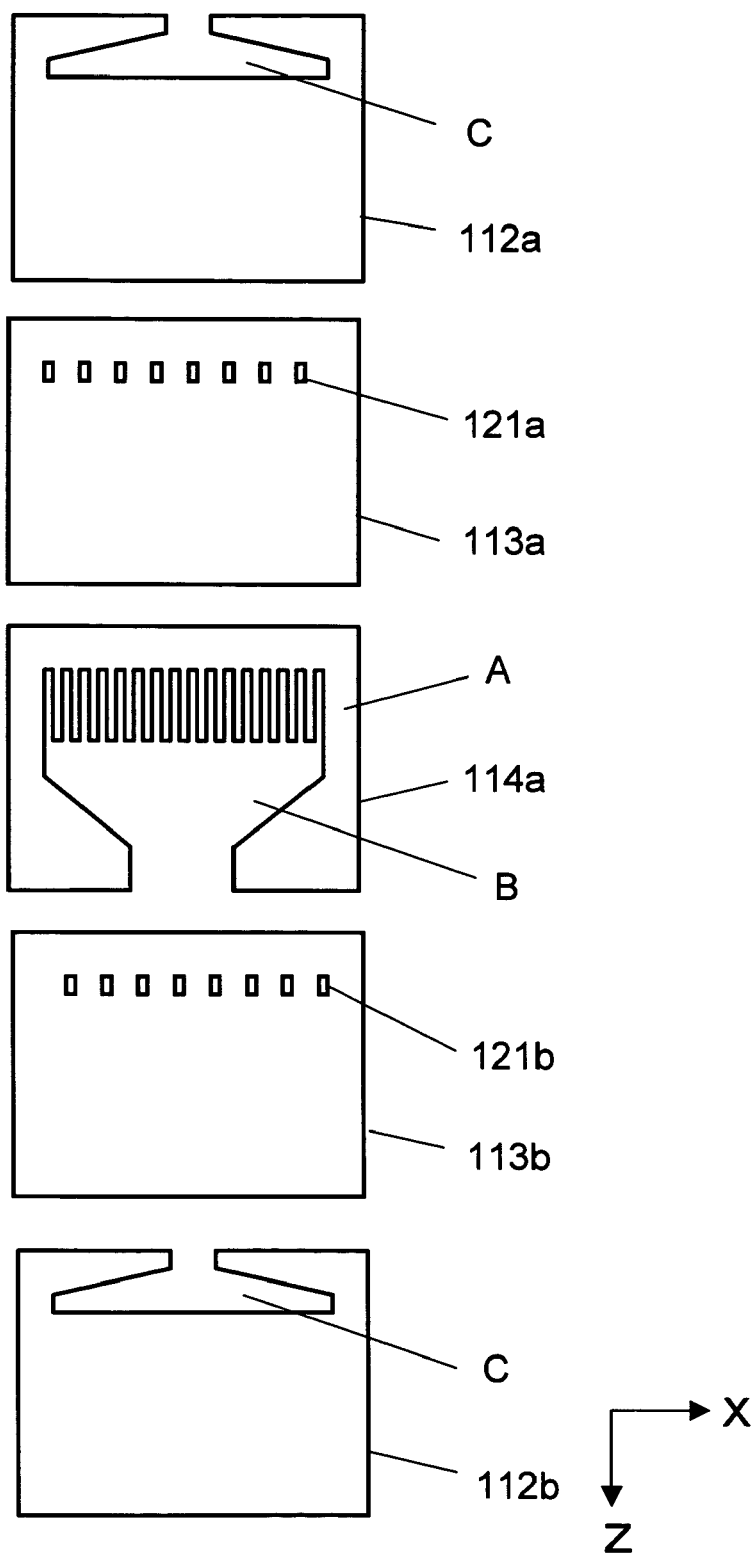
FIG. 16 is a front view showing a further other embodiment of a first combined stream forming device used in a stream combining apparatus of the invention, with respective parts disassembled and developed sequentially.

In the embodiment shown in FIG. 3 or FIG. 13, as shown in FIGS. 7 and 8, the bottom face of each slit is inclined as indicated by the ridgeline 34a or the ridgeline 34b, and the positional relation between the bottom end portions 42a of the ridgelines 34a or the bottom end portions 42b of the ridgelines 34b and the bottom faces 23 of the liquid retaining sections 22 is selected as shown in FIGS. 9 and 10, to provide a structure in which the liquid streams flowing from the liquid retaining sections 22 of the components C to the slit sections 33 are allowed to flow into the slits 32a but are not allowed to flow into the slits 32b adjacent to the slits 32a. In this embodiment, the liquid stream inlet of each slit of the component A is formed as a face formed by the height between the top end portion 41a of the ridgeline 34a and the bottom face 23 of the liquid retaining section 22 and by the slit clearance of the slit 32a in FIG. 9, or as a face formed by the height between the top end portion b of the ridgeline 34b and the bottom face 23 of the liquid retaining section 22 and by the slit clearance of the slit 32b in FIG. 10. However, the formation of the liquid stream inlet of each slit of the component A is not limited to this embodiment. FIG. 16 shows another embodiment.

FIG. 16 shows the disposition of plates as an embodiment different from those of the plates disposed in FIGS. 3 and 13. In FIG. 16, the end plates at both the ends in the disposition of plates are omitted. As the end plates, those similar to the end plates 11a and 11b shown in FIG. 3 or FIG. 13 can be used.

The plates disposed in FIG. 16 are a first plate 112a, a second plate 113a, a third plate 114a, a fourth plate 113b and a fifth plate 112b. The first plate 112a and the fifth plate 112b in FIG. 16 are identical with the first plate 12a and the third plate 12b in FIG. 3 and are provided as components C respectively having a liquid retaining section. In FIG. 16, the third plate 114a is a slit plate corresponding to the slit plate of the second plate 13a in FIG., but unlike the slit plate in FIG. 3, the lengths of all the slits (lengths of slit walls in the Z-axis direction) in the slit plate in FIG. 16 are equal.

In the embodiment of FIG. 16, since the lengths of all the slits of the slit plate are equal, the second plate 113a is installed between the first plate 112a provided as a component C and the third plate 114a provided as a component A, while the fourth plate 113b is installed between the fifth plate 112b provided as another component C and the third plate 114a provided as the component A, in order that the liquid streams from the liquid retaining sections of the components C can be allowed to selectively flow into certain slits and the slits adjacent to the certain slits. In the second plate 113a, holes 121a are formed at intervals. The respective holes 121a are formed in the second plate 113a in such a positional relation that the respective holes 121a correspond to every other slits among all the slits of the third plate 114a. In the fourth plate 113b, holes 121b are formed at intervals as in the second plate 113a. The respective holes 121b are formed in the fourth plate 113b in such a positional relation that the respective holes 121b correspond to every other slits among all the slits of the third plate 114a. However, the holes 121a of the second plate 113a and the holes 121b of the fourth plate 113b are positioned in such a manner that they correspond alternately to the respectively adjacent slits of the third plate. In this constitution, the liquid stream (first liquid stream) from the first plate 112a and the liquid stream (second liquid stream) from the fifth plate 112b are supplied alternately to the respective adjacent slits. In the following description, the second plate 113a having the holes 121a and the fourth plate 113b having the holes 121b may be generally referred to as a liquid stream introducing hole plate 113 as a whole.

In FIG. 16, at least another necessary set corresponding to the set comprising the second plate 113a, the third plate 114a, the fourth plate 113b and the firth plate 112b is omitted. Further, in this embodiment, a component B having a first stream combining section for combining the first liquid stream layers and the second liquid stream layers formed after having passed through the slits, to form a first layered liquid stream is provided below the slit section of the third plate 114a as in the case of the second plate 13a in FIG. 3. The forms of the holes 121a and 121b of the liquid stream introducing hole plates 113 may be any of circles, rectangles, trapezoids, etc.

According to the embodiment shown in FIG. 16 using the holes 121a and 121b through which liquid streams selectively pass, the form of the component A can be simple, compared with the embodiment shown in FIG. 3 in which the sectional area of each slit on the liquid stream supply face side of the component A must be different from that on the liquid stream non-supply face side. However, in the embodiment shown in FIG. 16, since the liquid stream introducing hole plates 113 are necessary, the number of parts constituting the apparatus increases, and higher aligning accuracy is required. Moreover, the difference in the flow rates of liquid streams in the Y-axis direction is likely to be large.

It is preferred that the components A and B in the invention are provided in one integral part like the second plate 13a in FIG. 3 or the third plate 114a in FIG. 16. In the case where the components A and B are provided in one integral part, it is not necessary to align the components A and B when those components are installed in the first combined stream forming device, and a layered product with higher layer accuracy can be produced.

The invention has a component D having a second stream combining section for combining the at least two first layered liquid streams formed by the at least two mutually independent components A and the components B corresponding to the components A, to form a second layered liquid stream.

Examples of the component D having a second stream combining section are already shown as the second combined stream forming device 4 in FIG. 11 and the second combined stream forming device 4a in FIG. 14. As shown in FIGS. 11 and 12, the layered liquid stream 81 passes through the passages 81a and 81b and flows into the second stream combining section 84, and the second layered liquid stream 82 passes through the passages 82a and 82b and flows into the second stream combining section 84. FIGS. 14 and 15 also show a similar flow. While the layered liquid steams 81 and 82 flow into the second stream combining section 84, the positional relation between the passage 81a and the passage 82a in the Y-axis direction or X-axis direction is changed to the positional relation between the passage 81b and the passage 82b in the X-axis direction or Y-axis direction. Furthermore, the cross sectional forms of the passage 81b and the passage 82b change for combination at the second stream combining section 84 while the passages reach the second stream combining section 84. The positional changes of the passages or the changes in the cross sectional forms of the passages can be gradual and continuous or stepwise. It is more preferred that the changes in the cross sectional forms of passages occur with the cross sectional area of each passage kept constant. If the cross sectional area of each passage is kept constant, the flow velocity distribution of the liquid stream in each passage little changes, and highly accurate liquid stream layers can be obtained in the combined layered liquid stream .

Figure 17:
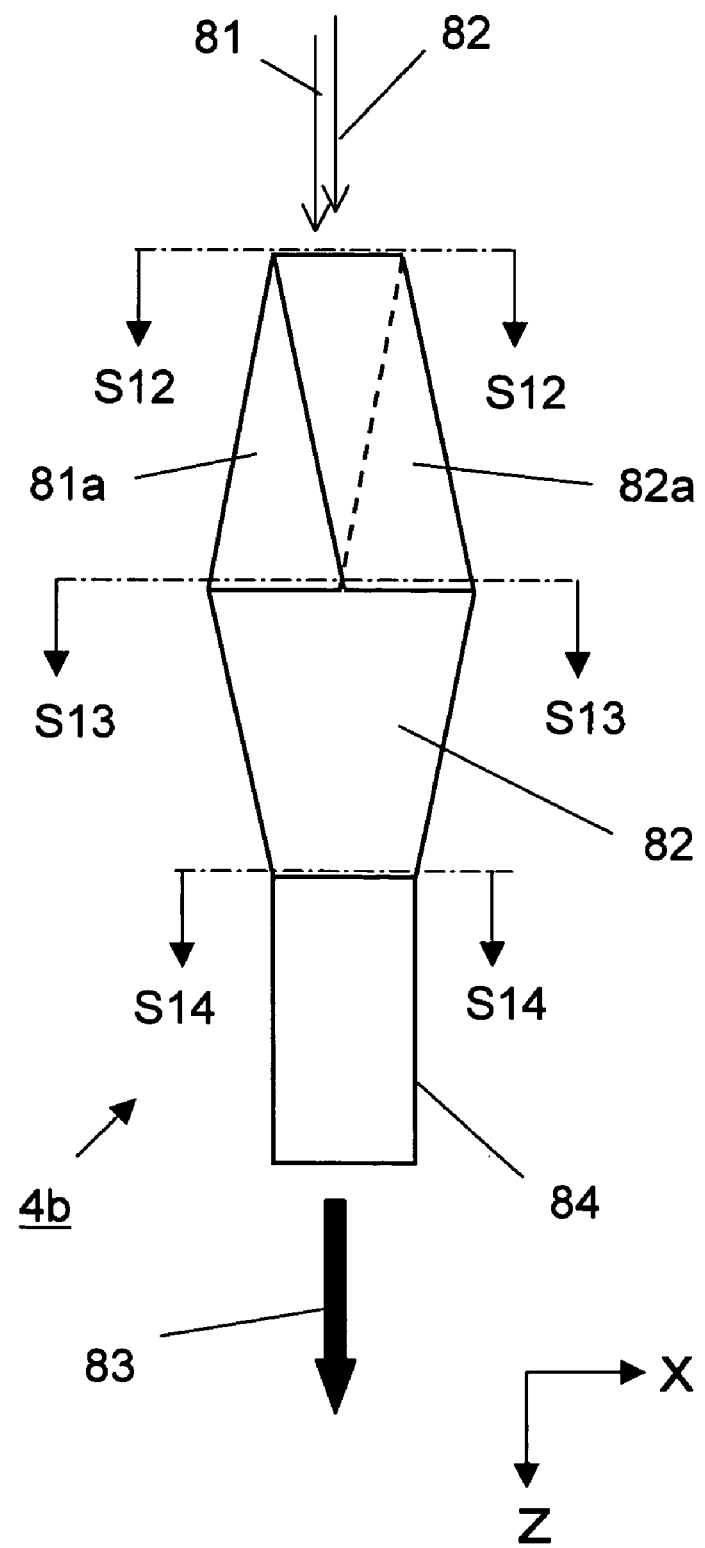
FIG. 17 is a schematic front typical view showing a further other embodiment of a second combined stream forming device used in a stream combining apparatus of the invention.
Figure 18:
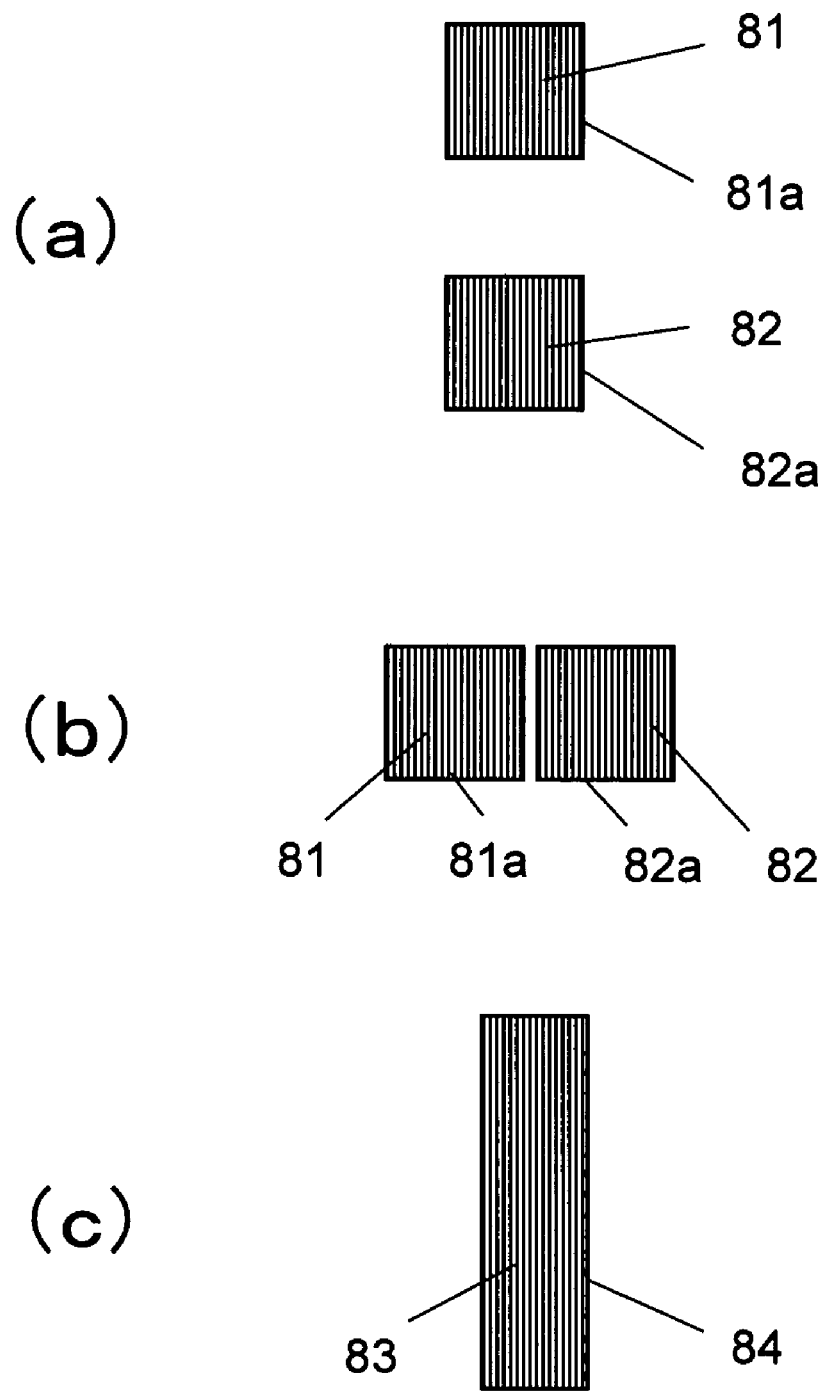
FIG. 18 is a group of sectional views along arrows S12-S12, S13-S13 and S14-S14 in FIG. 17. These sectional views are indicated by (a), (b) and (c) sequentially.

In FIGS. 17 and 18, while the first layered liquid stream 81 flows from the inlet to the outlet of the passage 81a, and while the second layered liquid stream 82 flows from the inlet to the outlet of the passage 82a, the direction of the passages 81a and 82a disposed is changed from the Y-axis direction to the X-axis direction. In this embodiment, the first layered liquid stream 81 passing through the outlet of the passage 81a and the second layered liquid stream 82 passing through the outlet of the passage 82a are immediately combined, and subsequently the combined stream flows along the passage 82, to reach the second stream combining section 84. The cross sectional form of the passage 82 changes with the cross sectional area kept constant in such a manner that the length of the passage 82 in the X-axis direction becomes gradually shorter while the length of the passage 82 in the Y-axis direction becomes gradually longer with approach to the second stream combining section 84. In this embodiment, after the first layered liquid stream 81 and the second layered liquid stream 82 are combined, the combined liquid stream flows along the passage changing in the cross sectional form, to reach the second stream combining section 84. This method is more preferred to the stream combining method shown in FIG. 11.

It is preferred that the length L of the component D in the liquid stream flowing direction satisfies the following formula (1). If the length L is less than the lower limit of the following formula, the change in the form of the passage is so sudden that the liquid stream flow velocity distribution becomes partial to lower the layer accuracy. Further, if the length L is larger than the upper limit of the following formula, the apparatus becomes so large that it is difficult to manufacture and assemble the apparatus.

$$Q/(10\sqrt{S}) \leq L \leq Q/(80\sqrt{S}) \quad \text{Formula (1)}$$

where L is the passage length of the component D [m], Q is the flow rate of the liquid streams [t/h], and S is the total sectional area of the passage at the inlet portion of the component D (the total of the cross sectional areas of the respective passages in FIG. 12 (a), FIG. 15 (a) or FIG. 18 (a)) [m$^2$].

It is preferred that the cross sectional forms of passages of the document D are rectangles. The reason is that unless the cross sectional forms of passages are rectangles, the respective liquid stream layers are greatly deformed at the peripheral portions of the cross sections. It is more preferred that the radius R of each corner of the rectangles is 10 μm to 1 mm. If the radius R of each corner is less than 10 μm, the liquid stream may be caused to be stagnant in the passages, and the liquid stream may, for example, thermally deteriorate as the case may be. If the radius R of each corner is more than 1 mm, the respective liquid stream layers may be deformed in the peripheral portions of the cross sections.

In the liquid stream combining apparatus of the invention, in the case where at least three or more components C exist and where liquid streams of the same material are supplied to two or more of the components C, it is preferred that the liquid stream passage (liquid stream supply pipe) connected to one supply source of the liquid streams is branched halfway into passages (pipelines) so that the liquid streams can be simultaneously supplied to the two or more components C. An example of this constitution can be seen in the second liquid stream supply pipe 74 in FIG. 1. In this constitution, the number of necessary liquid supply devices such as extruders or pumps can be decreased.

In the liquid stream combining apparatus of the invention, it is preferred that one component C is installed between adjacent components A, so that a liquid stream can be supplied from the one component C to the two components A. Examples of this constitution can be seen in the combination comprising the first plate 12a, the second plate 13a and the third plate 12b in FIG. 3 or 13, and also in the combination comprising the first plate 112a, the second plate 113a, the third plate 114a, the fourth plate 113b and the fifth plate 112b in FIG. 16. In this constitution, the first combined stream forming device 3 can be reduced in size.

If two components C exist between adjacent components A, one component C is provided for one component A, and this passage constitution is wasteful.

In the liquid stream combining apparatus of the invention, it is preferred that the slits of two components A are adjusted in direction to ensure that the layer (interface) directions of the liquid stream layers of the two respective layered liquid streams formed by components C become parallel to each other. Examples of this constitution can be seen in FIG. 12 (a), FIG. 15 (a) and FIG. 18 (a). In the case where the slits of the two components A are disposed in such a manner that the layer directions of the liquid stream layers of the two layered liquid streams do not become parallel to each other, it is necessary to twist the passage, for example, the passage a or 82a for keeping the respective liquid stream layers (interfaces) substantially parallel to each other in the combined layered liquid stream 83. In such a case, the liquid stream layers are liable to be deformed at the peripheral portions of the cross sections of the liquid streams. It is more preferred that all the slits of the respective components A are disposed in the same direction in either the Y-axis direction or the X-axis direction. In this disposition, the respective components A can be formed by plates and the apparatus can be made compact. Moreover, since wasteful passages and twisted passages can be avoided, stagnant liquid streams in the passages and the decline in the layer accuracy of liquid streams can be prevented.

If the liquid stream combining apparatus of the invention is used, a layered product (multilayered film) having a very large number of layers, which could not have been produced by the conventional liquid stream combining apparatuses, can be produced. Particularly, a layered product (multilayered film) having more than 300 layers, more than 700 layers or more than 1,000 layers can be produced. In this production, the ingress of the foreign matters generated by the thermal deterioration of the materials (polymers) forming the layered product (multilayered film) into the layered product (multilayered film) can be prevented. Moreover, the unevenness of the layer structure of the layered product (multilayered film) by the deformation of the layer structure due to the unevenness in the flow rates of liquid streams can also be prevented.

Further, the liquid stream combining apparatus of the invention allows a layered product (multilayered film) having high layer accuracy to be easily produced compared with the case of using a conventional liquid stream combining apparatus in combination with a square mixer, and ensures that a layered product (multilayered film) having a complicated layer constitution can be freely designed, though a square mixer did not allow such a design.

Therefore, the liquid stream combining apparatus of the invention allows the production of a multilayered film having a multilayered structure comprising 700 or more layers in a desired layer constitution. Moreover, even if the number of layers is very large, the thicknesses of the respective layers can be freely designed. Furthermore, such a multilayered film can be used as a high performance film capable of reflecting broadband light, a film with the refractive index in it controlled, an optical waveguide film, or a film, all or some layers of which have thicknesses in the order of nanometers.

The physical values stated in the specification are measured (evaluated) according to the following methods.

Thicknesses of Layers and Number of Layers:

As for the layer constitution of a film, a sample having a section cut using a microtome was observed with an electron microscope. That is, a transmission electron microscope HU-12 (produced by Hitachi, Ltd.) was used to magnify the section of the film to a range of 3,000 to 40,000 times and to photograph it, and the layer constitution and the thicknesses of the respective layers were measured. Depending on the combination of thermoplastic resins used, a publicly known staining technique can be used to enhance the contrast, though this technique was not used in the following examples, since sufficient contrasts could be obtained.

Reflectance:

A spectrophotometer (U-3410 Spectrophotometer) produced by Hitachi, Ltd. equipped with an integrating sphere 130-0632 having a diameter of 60 mm (produced by Hitachi, Ltd.) and a 10° inclination spacer was used to measure the reflectance of a film. The band parameter was set at 2/servo, and the gain was set at 3. Measurement was performed at a detection speed of 120 nm/min in a range from 187 nm to 2,600 nm. For standardization of reflectance, the accessory $BaSO_4$ was used as a standard reflection sheet.

Melt Viscosity:

A flow tester (CFT-500) produced by Shimadzu Corporation was used to measure the melt viscosity at a shear rate of 100 $(s^{-1})$. The diameter of the die used in this case was 1 mm, and the measuring stroke was 10 to 13 mm. The number of measuring times (n) was 3, and the average value was employed as the measured value.

EXAMPLE 1

As two thermoplastic resins, thermoplastic resin L1 and thermoplastic resin L2 were prearranged. The thermoplastic resin L1 used was polyethylene terephthalate (PET) having a melt viscosity of 1,800 poises at 280° C. [F20S produced by Toray Industries, Inc.]. The thermoplastic resin L2 used was polyethylene terephthalate having a melt viscosity of 3,500 poises at 280° C., obtained by copolymerizing 30 mol % of cyclohexanedimethanol with ethylene glycol (PE/CHDM·T) [PETG6763 produced by Eastman]. These thermoplastic resins L1 and L2 were dried and supplied to respectively different extruders.

The thermoplastic resins L1 and L2 were molten at 280° C. in the respective extruders and fed through a gear pump and a filter respectively, being combined by the liquid stream combining apparatus 1 of the invention. The liquid stream combining apparatus 1 was composed of a first combined stream forming device 3 shown in FIG. 13 containing three components A respectively having 201 slits and one component A having 200 slits, and a second combined stream forming device 4a shown in FIG. 14 as a component D. The respective slits of the slit sections 33 were different between the liquid stream supply face side and the liquid stream non-supply face side in cross sectional area as shown in FIGS. 7 and 8. In the form of the slit, the slit lengths of the respective slits were designed to ensure that the pressure loss difference became 1.5 MPa when the total amount of the thermoplastic resins supplied in this example was 200 kg/h, that the thicknesses of the layers became gradually smaller from the layer on the front face side to the layer of the rear face side, and that the ratio of the front face layer thickness/rear face layer thickness became 0.69.

The thermoplastic resin L1 was supplied to the first plate 12a installed as a component C, the fifth plate 12c installed as a component C and the ninth plate 12e installed as a component C in FIG. 13. The thermoplastic resin L2 was supplied to the third plate 12b installed as a component C and the seventh plate 12d installed as a component C in FIG. 13. In the obtained multilayered film in which the layers composed of the thermoplastic resin L1 and the layers composed of the thermoplastic resin L2 were alternately layered, both the surface layers were composed of the thermoplastic resin L1, and the thicknesses of the respective layers were made to be gradually larger from the front face side to the rear face side. The forms of the slits and the supplied amounts of the thermoplastic resins L1 and L2 were adjusted to ensure that the thickness ratio of the layer composed of the thermoplastic resin L1 to the layer composed of the thermoplastic resin L2 adjacent to each other became 0.95. A layered product (combined layered liquid stream 83) comprising 803 layers in total obtained like this was supplied to a T die and molded into a sheet, then being brought into contact with a revolving casting drum kept at a surface temperature of 25° C. by electrostatic application, to be quickly cooled and solidified.

The obtained cast film was heated by rolls set at 90° C., and while the film was quickly heated in a stretching section length of 100 mm by radiation heaters on both sides of the film, it was stretched in the machine direction to 3.4 times. Subsequently the monoaxially oriented film was treated with corona discharge in air on both surfaces, to keep the wet tension of the film at 55 mN/m. Then, the surfaces treated with corona discharge were respectively coated with a polyester resin having a glass transition temperature of 18° C. (a transparent layer), a polyester resin having a glass transition temperature of 82° C. (a lubricant layer) and silica particles having an average particle diameter of 100 nm (an adhesive layer), to form the respective layers in this order.

Figure 19:
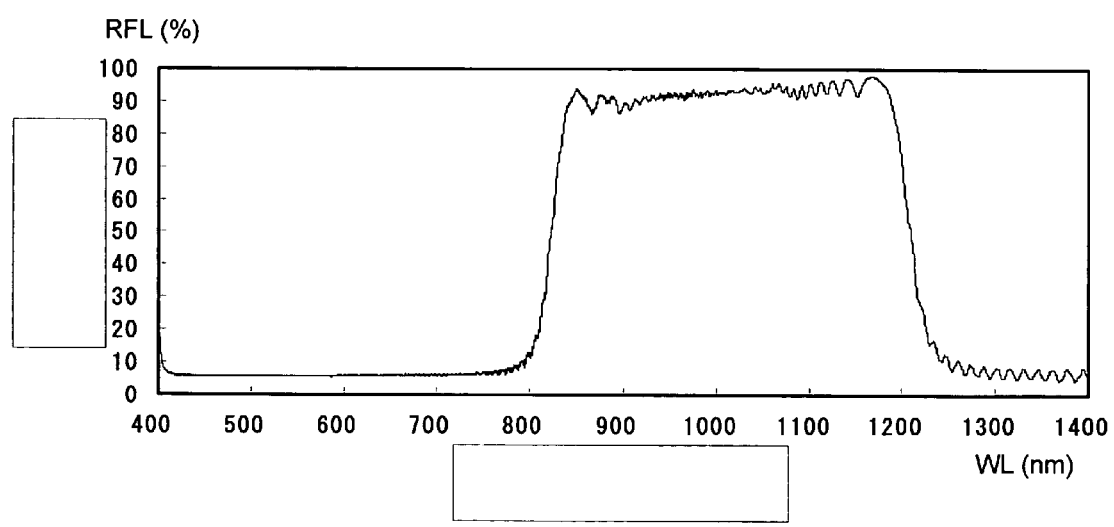
FIG. 19 is a graph showing the measured reflectance values of an example of a multilayered film produced using a stream combining apparatus of the invention.

Then, the monoaxially stretched film was introduced into a tenter and preheated with hot air of 110° C., being stretched in the transverse direction to 3.7 times. In succession, the stretched film was heat-treated by hot air of 230° C. as it was in the tenter, and further subjected to 5% relaxation treatment in the transverse direction at the same temperature, then being gradually cooled to room temperature and wound. The total thickness of the obtained film was 125 μm. The obtained film had a layer structure in which the thicknesses of the layers composed of the thermoplastic resin L1 became gradually smaller from 180 nm on the front face side to 125 nm on the rear face side, while the thicknesses of the layers composed of the thermoplastic resin L2 became gradually smaller from 190 nm on the front face side to 130 nm on the rear face side. The measured reflectance values of the film are shown in FIG. 19 as a graph. The wavelength WL (in nm) was chosen as the abscissa of the graph in FIG. 19, and the reflectance REF (in %) was chosen as the ordinate. From the graph, it can be seen that the obtained multilayered film has a very high reflectance and wavelength selectivity. On the other hand, even when the film production was continued for one week, neither the dissolution of the foreign matters due to thermal deterioration nor the frequent film breaking due to the foreign matters occurred, and the physical properties of the film did not change either.

EXAMPLE 2

The following two thermoplastic resins L3 and L4 were used.

Thermoplastic Resin L3:
A resin consisting of 20 wt % of polyethylene terephthalate (PET) having an intrinsic viscosity of 0.65 and 80 wt % of polyethylene naphthalate (PEN) having an intrinsic viscosity of 0.62.

Thermoplastic Resin L4:
A resin consisting of 90 wt % of polyethylene terephthalate (PET) having an intrinsic viscosity of 0.65 and 10 wt % of polyethylene naphthalate (PEN) having an intrinsic viscosity of 0.62.

These thermoplastic resins L3 and L4 were respectively dried and supplied into different extruders, being kept molten at 290° C.

The molten thermoplastic resins L3 and L4 were respectively fed through a gear pump and a filter, and supplied into the liquid stream combining apparatus 1 of the invention as described for Example 1. In the liquid stream combining apparatus, the thermoplastic resins L3 and L4 were combined to have a structure in which the thicknesses of the respective layers gradually changed from the surface layer sides toward the central side and that 402 resin L3 layers and 401 resin L4 layers were alternately layered in the thickness direction (both the surface layers were of the resin L3). The thicknesses of the respective layers were adjusted by the forms of the fine slits of the components A. The discharged amounts of the resins L3 and L4 were adjusted to achieve a total layer ratio (ratio by weight) of resin L3/resin L4=1.5.

The layered product comprising 803 layers in total obtained like this was supplied to a T die and molded into a sheet, being brought into contact with a revolving casting drum kept at a surface temperature of 25° C. by electrostatic application, to be quickly cooled and solidified. The obtained film had a thickness of 44 μm.

The thicknesses of the resin L3 layers as both the surface layers of the obtained film were respectively 10 nm, and the thicknesses of the resin L4 layers as the layers closest to both the surface layers were 100 nm. In the central portion, the resin L3 layer thickness was 100 nm, and the resin L4 layer thickness was 10 nm. The thicknesses of the resin L3 layers increased from 10 nm on the surface layer sides to 100 nm in the central portion, and the thicknesses of the resin L4 layers decreased from 100 nm on the surface layer sides to 10 nm in the central portion, in this constitution. The distribution of the thicknesses of the resin L3 layers was a quadratic function distribution with the largest thickness at the central portion of the film, and the distribution of the thicknesses of the resin L4 layers was a quadratic function distribution with the smallest thickness at the central portion of the film.

The distribution of refractive indexes in the thickness direction of the obtained film was a square distribution and was of GI (grated index) type. Since the film has a GI-type refractive index distribution, it could be used as an optical waveguide film allowing broadband communication. On the other hand, even when the film production was continued for one week, neither the dissolution of the foreign matters due to thermal deterioration nor the frequent film breaking due to the foreign matters occurred, and the physical properties of the film did not change either.

INDUSTRIAL APPLICABILITY

The invention is a liquid stream combining apparatus comprising a first combined stream forming device having components A, each of which has numerous slits for allowing any one of two or more liquid streams to be combined, to pass through the slits, and components B, each of which has a first stream combining section for combining the numerous liquid stream layers formed from the corresponding liquid stream that has passed through the numerous slits, in layers to form a first layered liquid stream, wherein two or more components A as specified above and independent from each other and two or more components B as specified above and independent from each other are provided. If the liquid stream combining apparatus is used, a multilayered film, for example, comprising more than 700 layers can be produced. Further, a multilayered film variously changed in the number of layers and in the thicknesses of the respective layers can be produced. Such a multilayered film can be used as a broadband interference reflection film, a refractive index control film, an optical waveguide film or a layered film having the thicknesses of the respective layers in the order of nanometers.

The invention claimed is:

1. A liquid stream combining apparatus for combining at least two liquid streams in layers, comprising
   (a) a component A having numerous slits therein through which the respective liquid streams are passed, each slit having a length in the respective liquid stream flow direction, a width in a slit width direction perpendicular to the respective liquid stream flow direction, and a clearance in a direction perpendicular to both the respective liquid stream flow direction and the slit width direction, the clearance being smaller than the width,
   (b) a component B having a first stream combining section therein for combining numerous layered liquid streams in a predetermined order each of which is formed with each of the liquid streams only upon passing the respective slits and for forming a first layered liquid stream,
   (c) wherein two or more of the component A are provided independently of each other in a direction along the slit width direction and two or more of the component B are also provided independently of each other in a direction along the slit width direction,
   (d) components C each of which has a liquid retaining section therein for receiving the respective liquid stream to be supplied to the liquid stream combining apparatus and for supplying the respective liquid streams to the respective components A, and
   (e) a component D which has a second stream combining section therein for combining the first layered liquid streams formed by the respective components B, in layers in a predetermined order, to form a second layered liquid stream
   further comprising slit plates and liquid stream introducing plates, wherein components A are formed in respective slit plates and components C are formed in respective liquid stream introducing plates, each liquid stream introducing plate being positioned for the flow of liquid from the component C of the liquid stream introducing plate to the component A of at least one of the slit plates.

2. The liquid stream combining apparatus, according to claim 1, wherein the number of slits formed in the components A is in the range of 10 to 400.

3. The liquid stream combining apparatus, according to claim 1, wherein the clearance of each of the slits formed in the component A is in the range of 10 μm to 30,000 μm.

4. The liquid stream combining apparatus, according to claim 1, wherein three or more components C are provided, and a passage dividing section for supplying the liquid streams of the same material to two or more of the component C is installed between a supply source of the liquid streams of the same material and the respective components C.

5. The liquid stream combining apparatus, according to claim 1, wherein among pairs, each comprising the component A and the component B, at least two pairs are disposed in such a manner that interfaces of the respective liquid streams in the first layered liquid stream formed by the component B are kept in parallel to each other.

6. The liquid stream combining apparatus, according to claim 1, wherein the component C is disposed between the adjacent components A.

7. The liquid stream combining apparatus, according to claim 1, wherein passages for supplying the liquid streams from the components C to the respective slits formed in the component A are formed as fine holes.

8. The liquid stream combining apparatus, according to claim 1, wherein the vertical sectional area of each of the slits formed in the component A on a liquid supply face side is different from that on a liquid non-supply face side.

9. The liquid stream combining apparatus, according to claim 1, wherein the width of each of the slits formed in the component A is in the range of 10 mm to 200 mm.

10. The liquid stream combining apparatus, according to claim 1, wherein the length of each of the slits formed in the component A is in the range of 20 mm to 200 mm.

11. The liquid stream combining apparatus, according to claim 1, wherein a form of each of the slits provided in the component A includes a portion in which the form is changed in stepwise in a slit clearance direction.

12. The liquid stream combining apparatus, according to claim 1, wherein a sectional form of a passage of the first layered liquid stream from the component B to the component D is rectangle.

13. The liquid stream combining apparatus, according to claim 12, wherein the radius R of each corner of the rectangle is in the range of 10 μm to 1 mm.

14. A method for producing a multilayered film comprises the steps of supplying at least two liquid streams into the liquid stream combining apparatus in any one of claims 1 through 13, and forming a multilayered film from a second layered liquid stream delivered from the liquid stream combining apparatus.

15. The liquid stream combining apparatus, according to claim 6, at least one of said liquid stream introducing plates is disposed between the adjacent components A.

16. The liquid stream combining apparatus, according to claim 1, wherein the slits of component A extend in the same liquid stream flow direction.

17. The liquid stream combining apparatus, according to claim 1, wherein each of the liquid retaining sections of respective components C is positioned to supply the respective liquid streams to the respective components A in the slit width direction.

18. The liquid stream combining apparatus, according to claim 1, wherein the liquid streams enter the first stream combining section of component B from the slits of component A at the same location along the respective liquid stream flow directions.

* * * * *